(12) United States Patent
Huang

(10) Patent No.: US 12,232,135 B2
(45) Date of Patent: Feb. 18, 2025

(54) METHOD AND APPARATUS FOR CROSS CARRIER SCHEDULING CONSIDERING MULTI-TRP IN A WIRELESS COMMUNICATION SYSTEM

(71) Applicant: ASUSTek Computer Inc., Taipei (TW)

(72) Inventor: Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 371 days.

(21) Appl. No.: 17/729,961

(22) Filed: Apr. 26, 2022

(65) Prior Publication Data

US 2022/0369352 A1 Nov. 17, 2022

Related U.S. Application Data

(60) Provisional application No. 63/180,870, filed on Apr. 28, 2021.

(51) Int. Cl.
*H04W 72/23* (2023.01)
*H04L 1/00* (2006.01)
*H04L 5/00* (2006.01)

(52) U.S. Cl.
CPC ........... *H04W 72/23* (2023.01); *H04L 1/0038* (2013.01); *H04L 5/0053* (2013.01)

(58) Field of Classification Search
CPC ..... H04L 1/0038; H04L 5/001; H04L 5/0035; H04L 5/0053; H04L 5/0094; H04W 72/23
See application file for complete search history.

(56) References Cited

FOREIGN PATENT DOCUMENTS

| ID | P202308825 A | * | 11/2023 | ............ H04L 411/08 |
| WO | WO-2022197803 A1 | * | 9/2022 | ............... H04L 1/08 |

OTHER PUBLICATIONS

Moderator (Qualcomm), "Discussion Summary for mTRP PDCCH Reliability Enhancements", Discussion/Decision, Agenda Item: 8.1.2.1, 3GPP TSG-RAN WG1 Meeting #104-bis-e, R1-210xxxx, e-Meeting, Apr. 12-Apr. 20, 2021.

* cited by examiner

*Primary Examiner* — Phuc H Tran
(74) *Attorney, Agent, or Firm* — Blue Capital Law Firm, P.C.

(57) ABSTRACT

A method and apparatus are disclosed from the perspective of a network in a wireless communication system. In one embodiment, the method includes the network configuring a User Equipment (UE) with cross-carrier scheduling, wherein the network transmits Physical Downlink Control Channel (PDCCH) on a first cell scheduling a second cell. The method further includes the network configuring the UE with PDCCH repetition on two search spaces of the first cell. In addition, the method includes the network being allowed to configure the UE with PDCCH repetition on two search spaces of the second cell only if two search spaces of the first cell, having same search space identities as the two search spaces of the second cell, have been configured with PDCCH repetition.

20 Claims, 14 Drawing Sheets

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 5 (PRIOR ART)

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

FIG. 6 (PRIOR ART)

| $\mu$ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

FIG. 7 (PRIOR ART)

|  | SS1 and SS2 of cell1 are linked | SS1 and SS2 of cell2 are linked |
|---|---|---|
| PDCCH from SS1, SS2 of cell1 | 1. Self-scheduling/self-carrier/cell scheduling<br>2. Linked<br>➤ X BDs for one pair of PDCCH (candidate)<br>➤ Limited configuration for SS1, SS2 of cell1 and/or CORESET of cell1<br>   ■ *nrofCandidates* of SS1, SS2 of cell1 is the same | 1. Self-scheduling/self-carrier/cell scheduling<br>2. Alt1: (Forced to) Linked<br>➤ X BDs for one pair of PDCCH (candidate)<br>➤ Limited configuration for SS1, SS2 of cell1 and/or CORESET of cell1<br>   ■ *nrofCandidates* of SS1, SS2 of cell1 is the same<br>2. Alt2: Not linked or can be not linked<br>➤ Y BDs for one pair of PDCCH (candidate)<br>➤ Configuration for SS1, SS2 of cell1 and/or CORESET of cell1 could be different<br>   ■ *nrofCandidates* of SS1, SS2 of cell1 could be different |
| PDCCH from SS1, SS2 of cell2 | 1. Cross-scheduling/cross-carrier/cell scheduling<br>2. Alt1: (Forced to) Linked<br>➤ X BDs for one pair of PDCCH (candidate)<br>➤ Limited configuration for SS1, SS2 of cell1 and/or CORESET of cell1<br>   ■ <u>*nrofCandidates* of SS1, SS2 of cell2 is the same</u><br>2. Alt2: Not linked or can be not linked<br>➤ Y BDs for one pair of PDCCH (candidate)<br>➤ Limited configuration for SS1, SS2 of cell1 and/or CORESET of cell1<br>   ■ <u>*nrofCandidates* of SS1, SS2 of cell2 could be different</u> | 1. Cross-scheduling/cross-carrier/cell scheduling<br>2. Linked<br>➤ X BDs for one pair of PDCCH (candidate)<br>➤ Limited configuration for SS1, SS2 of cell2 and/or CORESET of cell2<br>   ■ *nrofCandidates* of SS1, SS2 of cell2 is the same |

FIG. 9

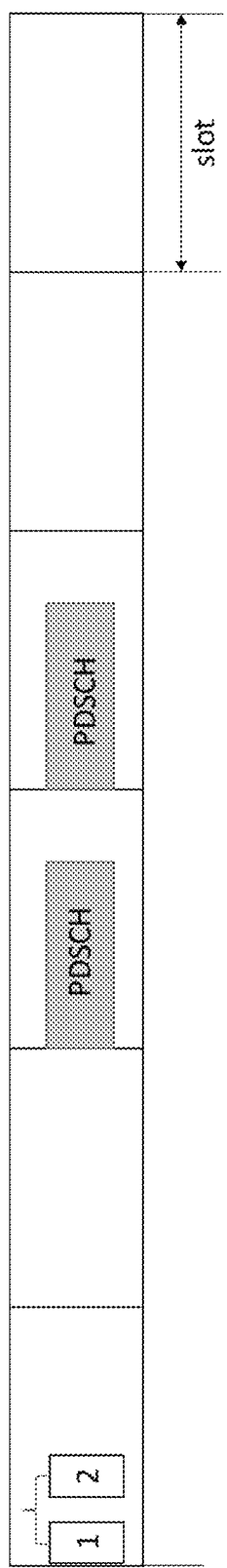
FIG. 10
 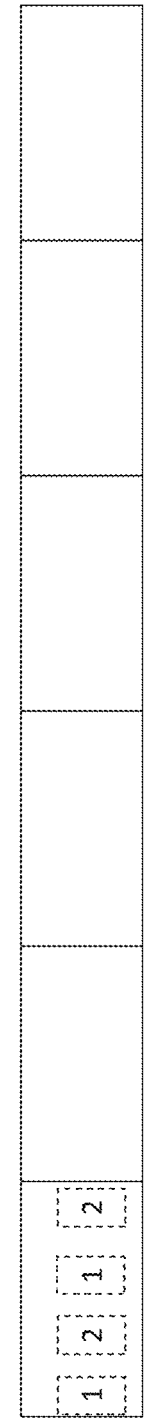
FIG. 11

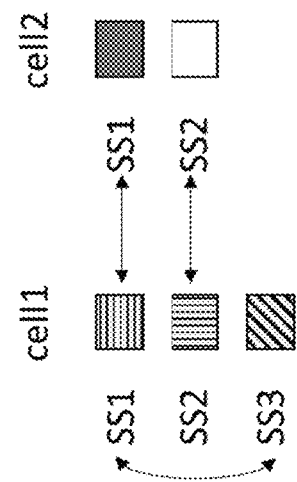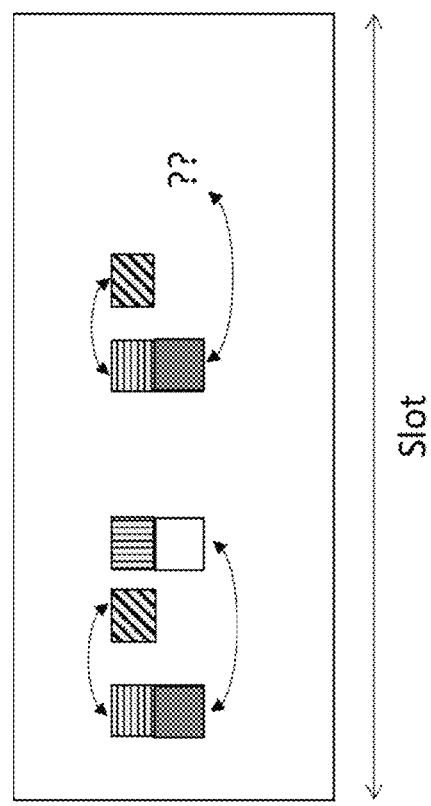
FIG. 12

METHOD AND APPARATUS FOR CROSS CARRIER SCHEDULING CONSIDERING MULTI-TRP IN A WIRELESS COMMUNICATION SYSTEM

CROSS-REFERENCE TO RELATED APPLICATIONS

The present Application claims the benefit of U.S. Provisional Patent Application Ser. No. 63/180,870 filed on Apr. 28, 2021, the entire disclosure of which is incorporated herein in its entirety by reference.

FIELD

This disclosure generally relates to wireless communication networks, and more particularly, to a method and apparatus for cross carrier scheduling considering multi-TRP in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network in a wireless communication system. In one embodiment, the method includes the network configuring a User Equipment (UE) with cross-carrier scheduling, wherein the network transmits Physical Downlink Control Channel (PDCCH) on a first cell scheduling a second cell. The method further includes the network configuring the UE with PDCCH repetition on two search spaces of the first cell. In addition, the method includes the network being allowed to configure the UE with PDCCH repetition on two search spaces of the second cell only if two search spaces of the first cell, having same search space identities as the two search spaces of the second cell, have been configured with PDCCH repetition.

BRIEF DESCRIPTION OF THE DRAWINGS

FIG. 5 is a reproduction of Table 7.3.1-1 of 3GPP TS 38.212.

FIG. 6 is a reproduction of Table 10.1-2 of 3GPP TS 38.213 V16.3.0.

FIG. 7 is a reproduction of Table 10.1-3 of 3GPP TS 38.213 V16.3.0.

FIG. 9 is an information table according to one exemplary embodiment.

FIG. 10 is a diagram according to one exemplary embodiment.

FIG. 11 is a diagram according to one exemplary embodiment.

FIG. 12 is a diagram according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.212 V16.2.0, "NR Multiplexing and channel coding (Release 16)"; TS 38.213 V16.3.0, "NR Physical layer procedures for control (Release 16)"; RP-193133, "New WID: Further enhancements on MIMO for NR," Samsung; TS 38.331 V16.2.0 "NR; Radio Resource Control (RRC) protocol specification (Release 16)"; Final Report of 3GPP TSG RAN WG1 #102-e V1.0.0, (Online meeting, 17-28 Aug. 2020); Chairman's Notes RAN1 #103-e V033; Draft Report of 3GPP TSG RAN WG1 #104-e V0.3.0, (Online meeting, 25 Jan.-5 Feb. 2021); and Chairman's Notes RAN1 #104b-e V012. The standards and documents listed above are hereby expressly incorporated by reference in their entirety.

Figure 1:
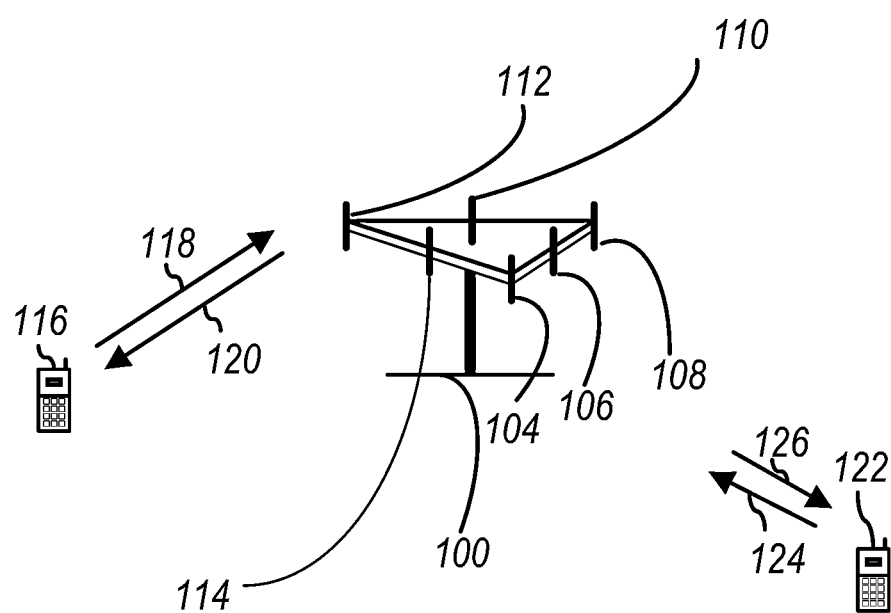
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
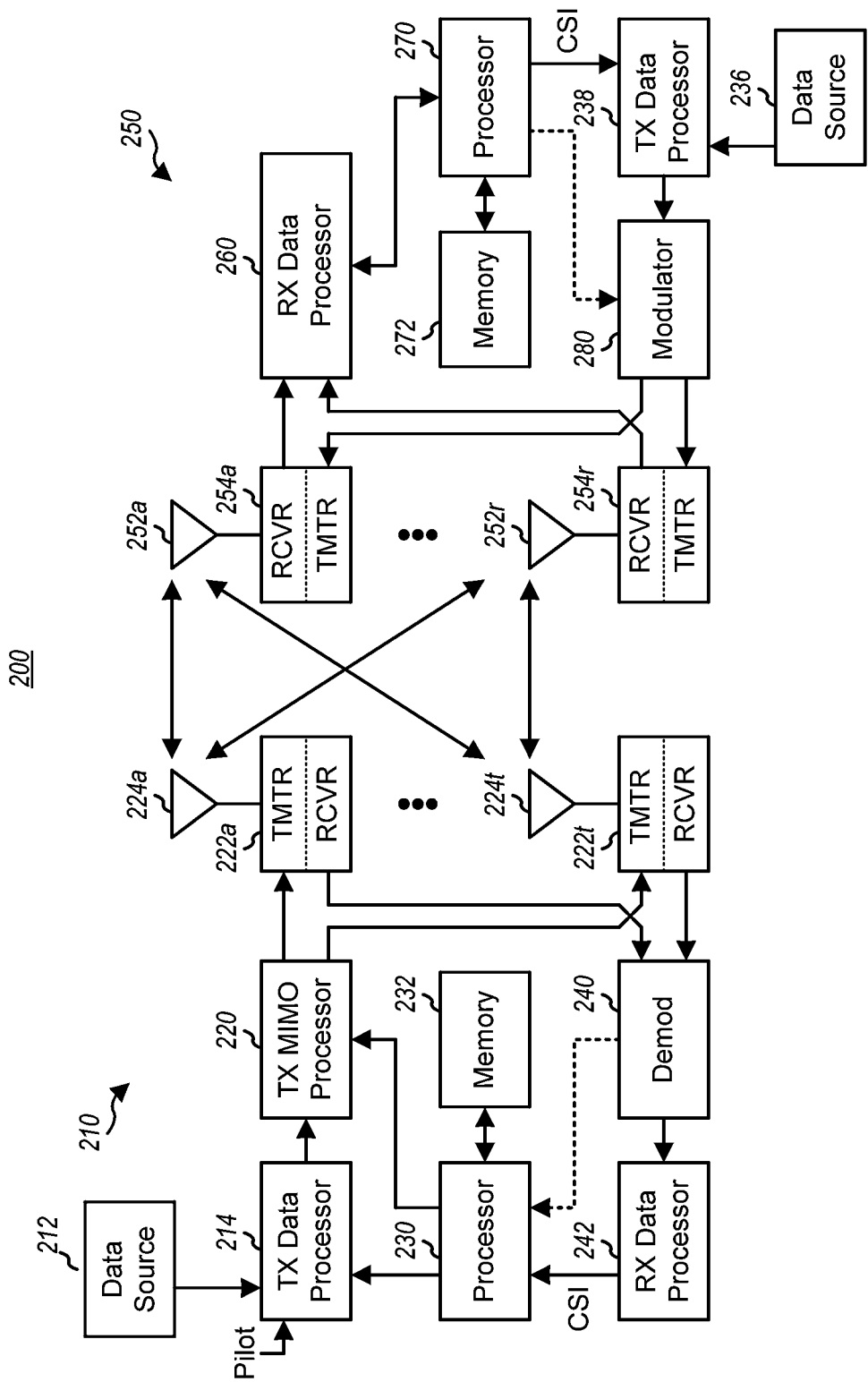
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
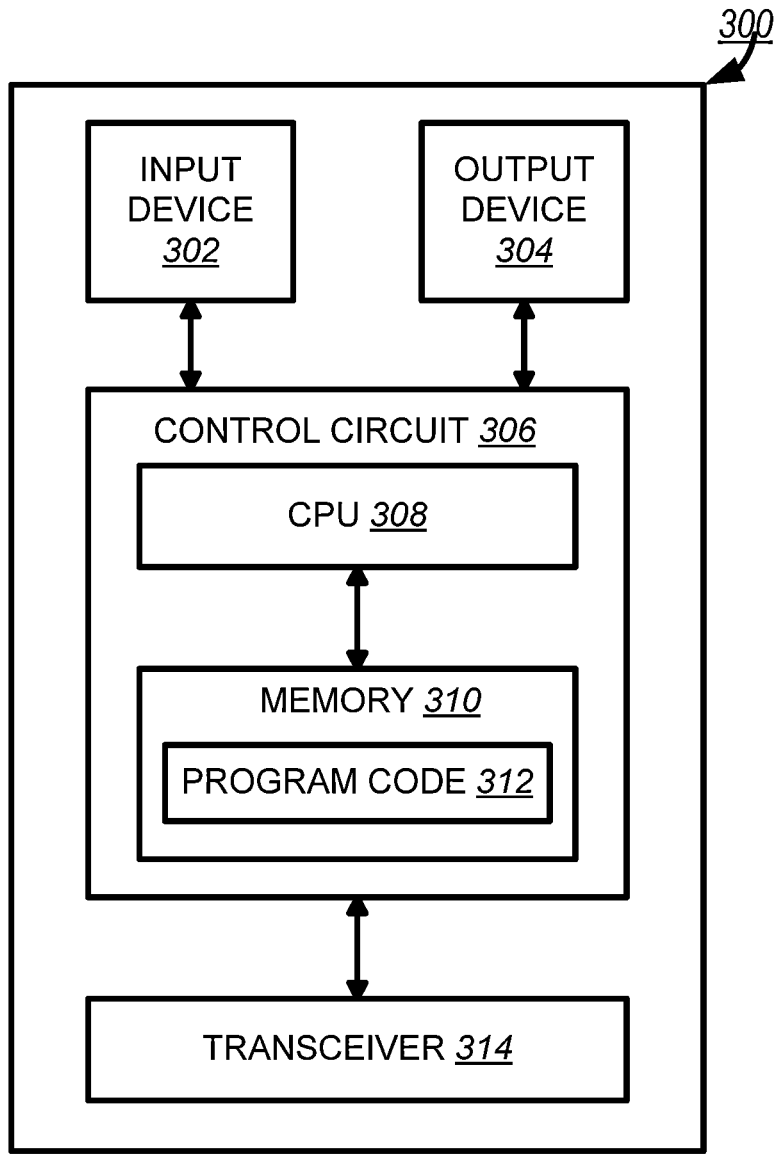
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
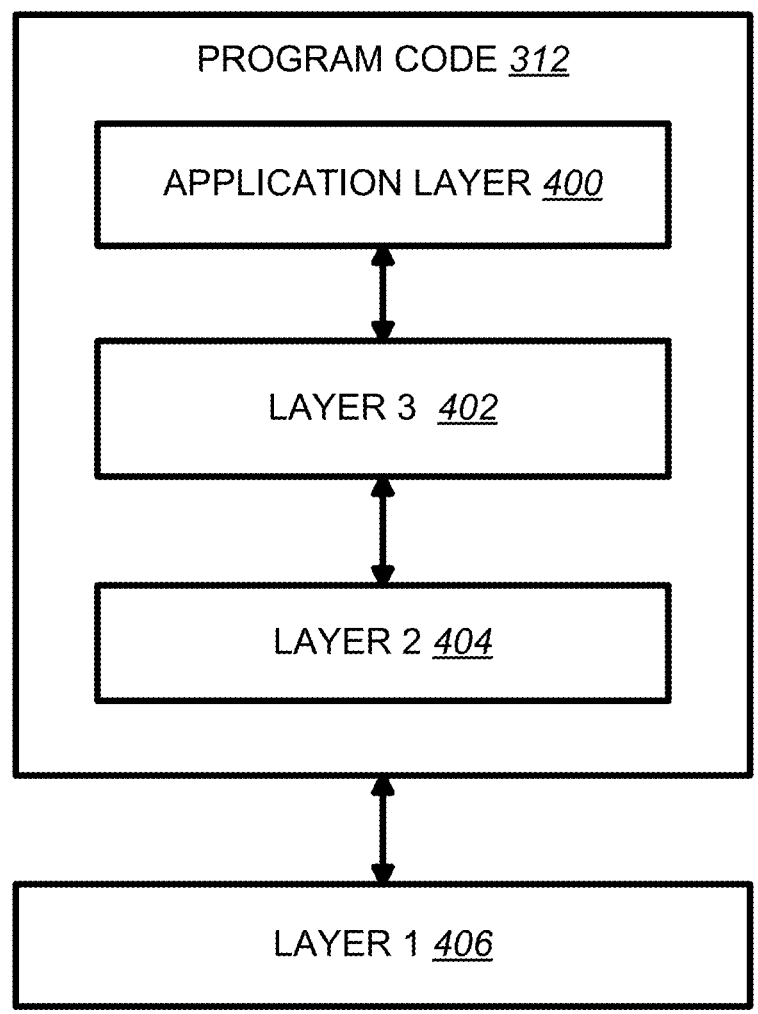
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.212 Rel-16 provides some related texts in NR as follows:

Table 7.3.1-1 of 3GPP TS 38.212, Entitled "DCI Formats", is Reproduced as FIG. 5

7.3.1.2.2 Format 1_1
DCI format 1_1 is used for the scheduling of PDSCH in one cell.
The following information is transmitted by means of the DCI format 1_1 with CRC scrambled by C-RNTI or CS-RNTI or MCS-C-RNTI:
  Identifier for DCI formats—1 bits
    The value of this bit field is always set to 1, indicating a DL DCI format
  Carrier indicator— 0 or 3 bits as defined in Clause 10.1 of [5, TS 38.213].
  Bandwidth part indicator— 0, 1 or 2 bits . . . .
  Frequency domain resource assignment—number of bits determined by the following, where $N_{RB}^{DL,BWP}$ is the size of the active DL bandwidth part:
  [ . . . ]
  Time domain resource assignment— 0, 1, 2, 3, or 4 bits as defined in Clause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
  VRB-to-PRB mapping—0 or 1 bit:
  [ . . . ]
For transport block 1:
  Modulation and coding scheme—5 bits as defined in Clause 5.1.3.1 of [6, TS 38.214]
  New data indicator—1 bit
  Redundancy version—2 bits as defined in Table 7.3.1.1.1-2
For transport block 2 (only present if maxNrofCodeWordsScheduledByDCI equals 2):
  Modulation and coding scheme—5 bits as defined in Clause 5.1.3.1 of [6, TS 38.214]
  New data indicator—1 bit
  Redundancy version—2 bits as defined in Table 7.3.1.1.1-2
[ . . . ]
HARQ process number—4 bits
Downlink assignment index—number of bits as defined in the following
[ . . . ]
TPC command for scheduled PUCCH—2 bits as defined in Clause 7.2.1 of [5, TS 38.213]
PUCCH resource indicator—3 bits as defined in Clause 9.2.3 of [5, TS 38.213]
PDSCH-to-HARQ_feedback timing indicator—0, 1, 2, or 3 bits as defined in Clause 9.2.3 of [5, TS 38.213]. The bitwidth for this field is determined as $\lceil \log_2(I) \rceil$ bits, where I is the number of entries in the higher layer parameter dl-DataToUL-ACK.
[ . . . ]

Transmission configuration indication—0 bit if higher layer parameter tci-PresentInDCI is not enabled; otherwise 3 bits as defined in Clause 5.1.5 of [6, TS38.214].

If "Bandwidth part indicator" field indicates a bandwidth part other than the active bandwidth part,
  if the higher layer parameter tci-PresentInDCI is not enabled for the CORESET used for the PDCCH carrying the DCI format 1_1,
    the UE assumes tci-PresentInDCI is not enabled for all CORESETs in the indicated bandwidth part;
  otherwise,
    the UE assumes tci-PresentInDCI is enabled for all CORESETs in the indicated bandwidth part.

3GPP TS 38.213 Rel-16 provides some related texts in NR as follows:

For each CORESET, the UE is provided the following by ControlResourceSet:
  a CORESET index p, by controlResourceSetId, where
  [ . . . ]
  a DM-RS scrambling sequence initialization value by pdcch-DMRS-ScramblingID;
  a precoder granularity for a number of REGs in the frequency domain where the UE can assume use of a same DM-RS precoder by precoderGranularity;
  a number of consecutive symbols provided by duration;
  [ . . . 9
  an antenna port quasi co-location, from a set of antenna port quasi co-locations provided by TCI-State, indicating quasi co-location information of the DM-RS antenna port for PDCCH reception in a respective CORESET;
  [ . . . ]
  an indication for a presence or absence of a transmission configuration indication (TCI) field for a DCI format, other than DCI format 1_0, that schedules PDSCH receptions or indicates SPS PDSCH release and is transmitted by a PDCCH in CORESET p, by tci-PresentInDCI or tci-PresentInDCI-ForDCIFormat1_2-r16.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^{\mu}$ [4, TS 38.211] in a frame with number $n_f$ if $(n_f \cdot N_{slot}^{frame,\mu} + n_{s,f}^{\mu} - o_s) \bmod k_s = 0$. The UE monitors PDCCH candidates for search space set s for $T_s$ consecutive slots, starting from slot $n_{s,f}^{\mu}$, and does not monitor PDCCH candidates for search space set s for the next $k_s - T_s$ consecutive slots.

A USS at CCE aggregation level L∈{1, 2, 4, 8, 16} is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in a USS, if the UE is not configured with a carrier indicator field, the UE monitors the PDCCH candidates without carrier indicator field. For an active DL BWP of a serving cell on which a UE monitors PDCCH candidates in a USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

Table 10.1-2 provides the maximum number of monitored PDCCH candidates, $M_{PDCCH}^{max,slot,\mu}$, per slot for a UE in a DL BWP with SCS configuration $\mu$ for operation with a single serving cell.

Table 10.1-2 of 3GPP TS 38.213 V16.3.0, Entitled "Maximum Number $M_{PDCCH}^{max,slot,\mu}$ of Monitored PDCCH Candidates Per Slot for a DL BWP with SCS Configuration $\mu \in \{0, 1, 2, 3\}$ for a Single Serving Cell", is Reproduced as FIG. 6

Table 10.1-3 provides the maximum number of non-overlapped CCEs, $C_{PDCCH}^{max,slot,\mu}$, for a DL BWP with SCS configuration $\mu$ that a UE is expected to monitor corresponding PDCCH candidates per slot for operation with a single serving cell.

CCEs for PDCCH candidates are non-overlapped if they correspond to
   different CORESET indexes, or
   different first symbols for the reception of the respective PDCCH candidates.

Table 10.1-3 of 3GPP TS 38.213 V16.3.0, Entitled "Maximum Number $C_{PDCCH}^{max,slot,\mu}$ of Non-Overlapped CCEs Per Slot for a DL BWP with SCS Configuration $\mu \in \{0, 1, 2, 3\}$ for a Single Serving Cell", is Reproduced as FIG. 7

[ . . . ]

For each scheduled cell from the $N_{cells,r16}^{DL,(X,Y),\mu}$ downlink cells using combination (X,Y), the UE is not required to monitor on the active DL BWP with SCS configuration $\mu$ of the scheduling cell, more than min ($M_{PDCCH}^{max,(X,Y),\mu}$, $M_{PDCCH}^{total,(X,Y),\mu}$) PDCCH candidates or more than min ($C_{PDCCH}^{max,(X,Y),\mu}$, $C_{PDCCH}^{total,(X,Y),\mu}$) non-overlapped CCEs per span.

A UE does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For cross-carrier scheduling, the number of PDCCH candidates for monitoring and the number of non-overlapped CCEs per span or per slot are separately counted for each scheduled cell.

3GPP RP-193133 provides some contents related to the Rel-17 Further enhanced MIMO (FeMIMO) work item related texts in NR as follows:

4 Objective
4.1 Objective of SI or Core Part WI or Testing Part WI
   a. [ . . . ]
   2. Enhancement on the support for multi-TRP deployment, targeting both FR1 and FR2:
     a. Identify and specify features to improve reliability and robustness for channels other than PDSCH (that is, PDCCH, PUSCH, and PUCCH) using multi-TRP and/or multi-panel, with Rel.16 reliability features as the baseline Furthermore, 3GPP TS 38.331 V16.2.0 states:
CrossCarrierSchedulingConfig
   The IE CrossCarrierSchedulingConfig is used to specify the configuration when the cross-carrier scheduling is used in a cell.
CrossCarrierSchedulingConfig Information Element

```
-- ASN1START
-- TAG-CROSSCARRIERSCHEDULINGCONFIG-START
CrossCarrierSchedulingConfig ::=     SEQUENCE {
    schedulingCellInfo               CHOICE {
        own                          SEQUENCE {      -- Cross carrier
scheduling: scheduling cell
            cif-Presence             BOOLEAN
        },
        other                        SEQUENCE {      -- Cross carrier
scheduling: scheduled cell
            schedulingCellId         ServCellIndex,
            cif-InSchedulingCell     INTEGER (1..7)
        }
    },
    ...,
    [[
    carrierIndicatorSize-r16         SEQUENCE {
        carrierIndicatorSizeDCI-1-2-r16   INTEGER (0..3),
        carrierIndicatorSizeDCI-0-2-r16   INTEGER (0..3)
    }
OPTIONAL, -- Cond CIF-PRESENCE
    enableDefaultBeamForCCS-r16      ENUMERATED {enabled}
OPTIONAL -- Need S
    ]]
}
-- TAG-CROSSCARRIERSCHEDULINGCONFIG-STOP
-- ASN1STOP
```

| CrossCarrierSchedulingConfig field descriptions |
| --- |
| cif-Presence<br>The field is used to indicate whether carrier indicator field is present (value true) or not (value false) in PDCCH DCI formats, see TS 38.213 [13]. If cif-Presence is set to true, the CIF value indicating a grant or assignment for this cell is 0.<br>cif-InSchedulingCell<br>The field indicates the CIF value used in the scheduling cell to indicate a grant or assignment applicable for this cell, see TS 38.213 [13].<br>other<br>Parameters for cross-carrier scheduling, i.e., a serving cell is scheduled by a PDCCH on another (scheduling) cell. The network configures this field only for SCells.<br>own<br>Parameters for self-scheduling, i.e., a serving cell is scheduled by its own PDCCH.<br>schedulingCellId<br>Indicates which cell signals the downlink allocations and uplink grants, if applicable, for the concerned SCell. In case the UE is configured with DC, the scheduling cell is part of the same cell group (i.e. MCG or SCG) as the scheduled cell. If drx-ConfigSecondaryGroup is configured in the MAC-CellGroupConfig associated with this serving cell, the scheduling cell and the scheduled cell belong to the same Frequency Range. |

ControlResourceSet

The IE ControlResourceSet is used to configure a time/frequency control resource set (CORESET) in which to search for downlink control information (see TS 38.213 [13], clause 10.1).

ControlResourceSet Information Element

```
-- ASN1START
-- TAG-CONTROLRESOURCESET-START
ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)
OPTIONAL  -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE(1..maxNrofTCI-StatesPDCCH)) OF TCI-StateId
OPTIONAL, -- Cond NotSIB1-initialBWP
    tci-StatesPDCCH-ToReleaseList   SEQUENCE(SIZE(1..maxNrofTCI-StatesPDCCH)) OF TCI-StateId
OPTIONAL, -- Cond NotSIB1-initialBWP
    tci-PresentInDCI                ENUMERATED {enabled}
OPTIONAL, -- Need S
    pdcch-DMRS-ScramblingID         INTEGER (0..65535)
OPTIONAL, -- Need S
    ...,
    [[
    rb-Offset-r16                   INTEGER (0..5)
OPTIONAL, -- Need S
    tci-PresentForDCI-Format1-2-r16 INTEGER (1..3)
OPTIONAL, -- Need S
    coresetPoolIndex-r16            INTEGER (0..1)
OPTIONAL, -- Need S
    controlResourceSetId-v1610      ControlResourceSetId-v1610
OPTIONAL  -- Need S
    ]]
}
-- TAG-CONTROLRESOURCESET-STOP
-- ASN1STOP
```

| ControlResourceSet field descriptions |
| --- |
| duration
Contiguous time duration of the CORESET in number of symbols (see TS 38.211 [16], clause 7.3.2.2).
tci-PresentInDCI
This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in the scheduling cell (see TS 38.214 [19], clause 5.1.5).
tci-PresentDCI-1-2
Configures the number of bits for "Transmission configuration indicator" in DCI format 1_2. When the field is absent the UE applies the value of 0 bit for the "Transmission configuration indicator" in DCI format 1_2 (see TS 38.212, clause 7.3.1 and TS 38.214, clause 5.1.5). |

PhysCellId

The PhysCellId identifies the physical cell identity (PCI).

PhysCellId Information Element

```
-- ASN1START
-- TAG-PHYSCELLID-START
PhysCellId ::=            INTEGER (0..1007)
-- TAG-PHYSCELLID-STOP
-- ASN1STOP
```

ServCellIndex

The IE ServCellIndex concerns a short identity, used to identify a serving cell (i.e. the PCell, the PSCell or an SCell). Value 0 applies for the PCell, while the SCellIndex that has previously been assigned applies for SCells.

ServCellIndex Information Element

```
-- ASN1START
-- TAG-SERVCELLINDEX-START
ServCellIndex ::=     INTEGER (0..maxNrofServingCells-1)
-- TAG-SERVCELLINDEX-STOP
-- ASN1STOP
```

SearchSpace

The IE SearchSpace defines how/where to search for PDCCH candidates. Each search space is associated with one ControlResourceSet. For a scheduled cell in the case of cross carrier scheduling, except for nrofCandidates, all the optional fields are absent (regardless of their presence conditions).

SearchSpace Information Element

```
-- ASN1START
-- TAG-SEARCHSPACE-START
SearchSpace ::=                                     SEQUENCE {
    searchSpaceId                                       SearchSpaceId,
    controlResourceSetId
OPTIONAL,                       -- Cond SetupOnly       ControlResourceSetId
    monitoringSlotPeriodicityAndOffset                  CHOICE {
        sl1                                                 NULL,
        sl2                                                 INTEGER (0..1),
        sl4                                                 INTEGER (0..3),
        sl5                                                 INTEGER (0..4),
        sl8                                                 INTEGER (0..7),
        sl10                                                INTEGER (0..9),
        sl16                                                INTEGER (0..15),
        sl20                                                INTEGER (0..19),
        sl40                                                INTEGER (0..39),
        sl80                                                INTEGER (0..79),
        sl160                                               INTEGER (0..159),
        sl320                                               INTEGER (0..319),
        sl640                                               INTEGER (0..639),
        sl1280                                              INTEGER (0..1279),
        sl2560                                              INTEGER (0..2559)
    }
OPTIONAL,                       -- Cond Setup
    duration                                            INTEGER (2..2559)
OPTIONAL,                       -- Need R
    monitoringSymbolsWithinSlot                         BIT STRING (SIZE (14))
OPTIONAL,                       -- Cond Setup
    nrofCandidates                                      SEQUENCE {
        aggregationLevel1                                   ENUMERATED {n0, n1, n2, n3, n4, n5, n6, n8},
        aggregationLevel2                                   ENUMERATED {n0, n1, n2, n3, n4, n5, n6, n8},
        aggregationLevel4                                   ENUMERATED {n0, n1, n2, n3, n4, n5, n6, n8},
        aggregationLevel8                                   ENUMERATED {n0, n1, n2, n3, n4, n5, n6, n8},
        aggregationLevel16                                  ENUMERATED {n0, n1, n2, n3, n4, n5, n6, n8}
    }
OPTIONAL,                       -- Cond Setup
    searchSpaceType                                     CHOICE {
        common                                              SEQUENCE {
            dci-Format0-0-AndFormat1-0                          SEQUENCE {
            ...
```

-continued

```
OPTIONAL,                       }                         -- Need R
                                dci-Format2-0             SEQUENCE {
                                  nrofCandidates-SFI      SEQUENCE {
                                    aggregationLevel1     ENUMERATED {n1, n2}
OPTIONAL,                       -- Need R
                                    aggregationLevel2     ENUMERATED {n1, n2}
OPTIONAL,                       -- Need R
                                    aggregationLevel4     ENUMERATED {n1, n2}
OPTIONAL,                       -- Need R
                                    aggregationLevel8     ENUMERATED {n1, n2}
OPTIONAL,                       -- Need R
                                    aggregationLevel16    ENUMERATED {n1, n2}
OPTIONAL                        -- Need R
                                  },
                                  ...
                                }
OPTIONAL,                       -- Need R
                                dci-Format2-1             SEQUENCE {
                                  ...
                                }
OPTIONAL,                       -- Need R
                                dci-Format2-2             SEQUENCE {
                                  ...
                                }
OPTIONAL,                       -- Need R
                                dci-Format2-3             SEQUENCE {
                                  dummy1                  ENUMERATED {s11, s12, s14, s15, s18,
s110, s116, s120} OPTIONAL,  -- Cond Setup
                                  dummy2                  ENUMERATED {n1, n2},
                                  ...
                                }
OPTIONAL                        -- Need R
     },
     ue-Specific                                          SEQUENCE {
                                dci-Formats               ENUMERATED {formats0-0-And-1-0, formats0-
1-And-1-1},
                                ...,
                                [[
                                dci-Formats-MT-r16        ENUMERATED {formats2-5}
OPTIONAL,                       -- Need R
                                dci-FormatsSL-r16         ENUMERATED {formats0-0-And-1-0, formats0-1-And-
1-1, formats3-0, formats3-1,
                                                          formats3-0-And-3-1}
OPTIONAL,                       -- Need R
                                dci-FormatsExt-r16        ENUMERATED {formats0-2-And-1-2, formats0-1-And-
1-1And-0-2-And-1-2}
OPTIONAL                        -- Need R
                                ]]
     }
   }
OPTIONAL                        -- Cond Setup2
}
SearchSpaceExt-r16 ::=                                    SEQUENCE {
   controlResourceSetId-r16                               ControlResourceSetId-r16
OPTIONAL,                       -- Cond SetupOnly2
   searchSpaceType-r16                                    SEQUENCE {
     common-r16                                           SEQUENCE {
                                dci-Format2-4-r16         SEQUENCE {
                                  nrofCandidates-CI-r16   SEQUENCE {
                                    aggregationLevel1-r16 ENUMERATED {n1, n2}
OPTIONAL,                       -- Need R
                                    aggregationLevel2-r16 ENUMERATED {n1, n2}
OPTIONAL,                       -- Need R
                                    aggregationLevel4-r16 ENUMERATED {n1, n2}
OPTIONAL,                       -- Need R
                                    aggregationLevel8-r16 ENUMERATED {n1, n2}
OPTIONAL,                       -- Need R
                                    aggregationLevel16-r16 ENUMERATED {n1, n2}
OPTIONAL                        -- Need R
                                  },
                                  ...
                                }
OPTIONAL,                       -- Need R
                                dci-Format2-5-r16         SEQUENCE {
                                  nrofCandidates-IAB-r16  SEQUENCE {
                                    aggregationLevel1-r16 ENUMERATED {n1, n2}
OPTIONAL,                       -- Need R
                                    aggregationLevel2-r16 ENUMERATED {n1, n2}
```

|  |  |  |
|---|---|---|
| OPTIONAL, | -- Need R | |
| | aggregationLevel4-r16 | ENUMERATED {n1, n2} |
| OPTIONAL, | -- Need R | |
| | aggregationLevel8-r16 | ENUMERATED {n1, n2} |
| OPTIONAL, | -- Need R | |
| | aggregationLevel16-r16 | ENUMERATED {n1, n2} |
| OPTIONAL | -- Need R | |
| | }, | |
| | ... | |
| | } | |
| OPTIONAL, | -- Need R | |
| | dci-Format2-6-r16 | SEQUENCE { |
| | ... | |
| | } | |
| OPTIONAL, | -- Need R | |
| | ... | |
| } | | |
| } | | |
| OPTIONAL, | -- Cond Setup3 | |
| searchSpaceGroupIdList-r16 | | SEQUENCE (SIZE (1.. 2)) OF INTEGER (0..1) |
| OPTIONAL, | -- Need R | |
| freqMonitorLocations-r16 | | BIT STRING (SIZE (5)) |
| OPTIONAL | -- Need R | |
| } | | |
| -- TAG-SEARCHSPACE-STOP | | |
| -- ASN1STOP | | |

| SearchSpace field descriptions |
|---|
| common |
| Configures this search space as common search space (CSS) and DCI formats to monitor. |
| controlResourceSetId |
| The CORESET applicable for this SearchSpace. Value 0 identifies the common CORESET#0 configured in MIB and in ServingCellConfigCommon. Values 1..maxNrofControlResourceSets-1 identify CORESETs configured in System Information or by dedicated signalling. The CORESETs with non-zero controlResourceSetId are configured in the same BWP as this SearchSpace. If the field controlResourceSetId-r16 is present, UE shall ignore the controlResourceSetId (without suffix). |
| dci-Formats |
| Indicates whether the UE monitors in this USS for DCI formats 0-0 and 1-0 or for formats 0-1 and 1-1. |
| duration |
| Number of consecutive slots that a SearchSpace lasts in every occasion, i.e., upon every period as given in the periodicityAndOffset. If the field is absent, the UE applies the value 1 slot, except for DCI format 2_0. The UE ignores this field for DCI format 2_0. The maximum valid duration is periodicity-1 (periodicity as given in the monitoringSlotPeriodicityAndOffset). |
| monitoringSlotPeriodicityAndOffset |
| Slots for PDCCH Monitoring configured as periodicity and offset. If the UE is configured to monitor DCI format 2_1, only the values 'sl1', 'sl2' or 'sl4' are applicable. If the UE is configured to monitor DCI format 2_0, only the values 'sl1', 'sl2', 'sl4', 'sl5', 'sl8', 'sl10', 'sl16', and 'sl20' are applicable (see TS 38.213 [13], clause 10). If the UE is configured to monitor DCI format 2_4, only the values 'sl1', 'sl2', 'sl4', 'sl5', 'sl8' and 'sl10' are applicable. |
| monitoringSymbolsWithinSlot |
| The first symbol(s) for PDCCH monitoring in the slots configured for PDCCH monitoring (see monitoringSlotPeriodicityAndOffset and duration). The most significant (left) bit represents the first OFDM in a slot, and the second most significant (left) bit represents the second OFDM symbol in a slot and so on. The bit(s) set to one identify the first OFDM symbol(s) of the control resource set within a slot. If the cyclic prefix of the BWP is set to extended CP, the last two bits within the bit string shall be ignored by the UE or IAB-MT. For DCI format 2_0, the first one symbol applies if the duration of CORESET (in the IE ControlResourceSet) identified by controlResourceSetId indicates 3 symbols, the first two symbols apply if the duration of CORESET identified by controlResourceSetId indicates 2 symbols, and the first three symbols apply if the duration of CORESET identified by controlResourceSetId indicates 1 symbol. See TS 38.213 [13], clause 10. |
| nrofCandidates |
| Number of PDCCH candidates per aggregation level. The number of candidates and aggregation levels configured here applies to all formats unless a particular value is specified or a format-specific value is provided (see inside searchSpaceType). If configured in the SearchSpace of a cross carrier scheduled cell, this field determines the number of candidates and aggregation levels to be used on the linked scheduling cell (see TS 38.213 [13], clause 10). |
| searchSpaceGroupIdList |
| List of search space group IDs which the search space is associated with. The network configures at most 2 search space groups per BWP where the group ID is either 0 or 1. |
| searchSpaceId |

| SearchSpace field descriptions |
| --- |
| Identity of the search space. SearchSpaceId = 0 identifies the searchSpaceZero configured via PBCH (MIB) or ServingCellConfigCommon and may hence not be used in the SearchSpace IE. The searchSpaceId is unique among the BWPs of a Serving Cell. In case of cross carrier scheduling, search spaces with the same searchSpaceId in scheduled cell and scheduling cell are linked to each other. The UE applies the search space for the scheduled cell only if the DL BWPs in which the linked search spaces are configured in scheduling cell and scheduled cell are both active.<br>searchSpaceType<br>Indicates whether this is a common search space (present) or a UE specific search space as well as DCI formats to monitor for.<br>ue-Specific<br>Configures this search space as UE specific search space (USS). The UE monitors the DCI format with CRC scrambled by C-RNTI, CS-RNTI (if configured), and SP-CSI-RNTI (if configured) |

TCI-State

The IE TCI-State associates one or two DL reference signals with a corresponding quasi-colocation (QCL) type. TCI-State Information Element

```
-- ASN1START
-- TAG-TCI-STATE-START
TCI-State ::=          SEQUENCE {
    tci-StateId        TCI-StateId,
    qcl-Type1          QCL-Info,
    qcl-Type2          QCL-Info
        OPTIONAL,      -- Need R
    ...
}
QCL-Info ::=           SEQUENCE {
    cell               ServCellIndex
        OPTIONAL,      -- Need R
    bwp-Id             BWP-Id
        OPTIONAL,      -- Cond CSI-RS-Indicated
    referenceSignal    CHOICE {
        csi-rs         NZP-CSI-RS-ResourceId,
        ssb            SSB-Index
    },
    qcl-Type           ENUMERATED {typeA, typeB, typeC, typeD},
    ...
}
-- TAG-TCI-STATE-STOP
-- ASN1STOP
```

| QCL-Info field descriptions |
| --- |
| bwp-Id<br>The DL BWP which the RS is located in.<br>cell<br>The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5.<br>referenceSignal<br>Reference signal with which quasi-collocation information is provided as specified in TS 38.214 [19] subclause 5.1.5.<br>qcl-Type<br>QCL type as specified in TS 38.214 [19] subclause 5.1.5. |

The Final Report of 3GPP TSG RAN WG1 #102-e V1.0.0 states:

Agreement

To enable a PDCCH transmission with two TCI states, study pros and cons of the following alternatives:

Alt 1: One CORESET with two active TCI states

Alt 2: One SS set associated with two different CORESETs

Alt 3: Two SS sets associated with corresponding CORESETs

At least the following aspects can be considered: multiplexing schemes (TDM/FDM/SFN/combined schemes), BD/CCE limits, overbooking, CCE-REG mapping, PDCCH candidate CCEs (i.e. hashing function), CORESET/SS set configurations, and other procedural impacts.

Agreement

For non-SFN based mTRP PDCCH reliability enhancements, study the following options:

Option 1 (no repetition): One encoding/rate matching for a PDCCH with two TCI states Option 2 (repetition): Encoding/rate matching is based on one repetition, and the same coded bits are repeated for the other repetition. Each repetition has the same number of CCEs and coded bits, and corresponds to the same DCI payload.

Study both intra-slot repetition and inter-slot repetition

Option 3 (multi-chance): Separate DCIS that schedule the same PDSCH/PUSCH/RS/TB/etc. or result in the same outcome.

Study both cases of DCIS in the same slot and DCIS in different slots

Agreement

For mTRP PDCCH reliability enhancements, study the following multiplexing schemes TDM: Two sets of symbols of the transmitted PDCCH/ two non-overlapping (in time) transmitted PDCCH repetitions/non-overlapping (in time) multi-chance transmitted PDCCH are associated with different TCI states Aspects and specification impacts related to intra-slot vs inter-slot to be discussed FDM: Two sets of REG bundles/CCEs of the transmitted PDCCH/two non-overlapping (in frequency) transmitted PDCCH repetitions/non-overlapping (in frequency) multi-chance transmitted PDCCH are associated with different TCI states SFN: PDCCH DMRS is associated with two TCI states in all REGs/CCEs of the PDCCH Note: There is dependency between this scheme and Al 2d (HST-SFN)

Agreement

For Alt 1 (one CORESET with two active TCI states), study the following

Alt 1-1: One PDCCH candidate (in a given SS set) is associated with both TCI states of the CORESET.

Alt 1-2: Two sets of PDCCH candidates (in a given SS set) are associated with the two TCI states of the CORESET, respectively Alt 1-3: Two sets of PDCCH candidates are associated with two corresponding SS sets, where both SS sets are associated with the CORESET and each SS set is associated with only one TCI state of the CORESET Agreement For Alt 1-2/1-3/2/3, study the following Case 1: Two (or more) PDCCH candidates are explicitly linked together (UE knows the linking before decoding)

Case 2: Two (or more) PDCCH candidates are not explicitly linked together (UE does not know the linking before decoding)

The Chairman's Notes RAN1 #103-e V033 states:

Agreement

For PDCCH reliability enhancements with non-SFN schemes, support at least Option 2+Case 1.

Maximum number of linked PDCCH candidates is two

Working Assumption

For PDCCH reliability enhancements with non-SFN schemes and Option 2+Case 1, support Alt3 (two SS sets associated with corresponding CORESETs).

Agreement

For PDCCH reliability enhancements with non-SFN schemes and Option 2+Case 1, CCEs of the two PDCCH candidates are counted separately following Rel. 15/16 procedures. Further study the BD limit by considering the following With respect to the complexity associated with RE de-mapping/demodulation, 2 units are required With respect to the complexity associated with decoding, the following assumptions can be further discussed:

Assumption 1: UE only decodes the combined candidate without decoding individual PDCCH candidates Assumption 2: UE decodes individual PDCCH candidates Assumption 3: UE decodes the first PDCCH candidate and the combined candidate Assumption 4: UE decodes each PDCCH candidate individually, and also decodes the combined candidate Note 1: The Assumptions 1-4 are for discussion purpose only, and they may or may not have specification impact.

FFS: The relationship between UE capability, RRC configuration, and the BD limit, and whether the Assumptions 1-4 are relevant for this purpose.

Note 2: the BD/CCE limit here is counted based on the configuration of PDCCH monitoring capability (e.g. per slot or per span).

The Draft Report of 3GPP TSG RAN WG1 #104-e V0.3.0 states:

Agreement

Confirm the Working Assumption:

For PDCCH reliability enhancements with non-SFN schemes and Option 2+Case 1, support Alt3 (two SS sets associated with corresponding CORESETs).

Agreement

For PDCCH repetition, support linking two SS sets by RRC configuration:

FFS: Whether MAC-CE can be used additionally

When PDCCH repetition is monitored in two linked SS sets, the UE does not expect a third monitored SS set to be linked with any of the two linked SS sets.

The two linked SS sets have the same SS set type (USS/CSS)

The two linked SS sets have the same DCI formats to monitor

For intra-slot PDCCH repetition,

The two SS sets should have the same periodicity and offset (monitoringSlotPeriodicityAndOffset), and the same duration For linking monitoring occasions across the two SS sets that exist in the same slot:
  The two SS sets have the same number of monitoring occasions within a slot and n-th monitoring occasion of one SS set is linked to n-th monitoring occasion of the other SS set Agreement
When two SS sets are linked for PDCCH repetition, they do not contain individual PDCCH candidates.
  Note 1: For configuration of individual PDCCH candidates, a different SS set can be configured by network.
  Note 2: When one of the linked PDCCH candidates uses the same set of CCEs as an individual PDCCH candidate, and they both are associated with the same DCI size, scrambling, and CORESET, Rel. 15 rule is followed wrt not counting an additional BD.

Agreement
For PDCCH repetition, two PDCCH candidates in two SS sets are linked based on
  Having the same AL and the same candidate index:
    Two linked SS sets are configured with the same number of candidates for each AL.

The Chairman's Notes RAN1 #104b-e V012 states:

Agreement
When DL DCI is transmitted via PDCCH repetition, for PUCCH resource determination for HARQ-Ack when the corresponding PUCCH resource set has a size larger than eight, starting CCE index and number of CCEs in the CORESET of one of the linked PDCCH candidates is applied, and option 2 is supported
  Option 2: The one with the lowest SS set ID is applied.
  FFS: Support of Option 2 does not mean PDCCH repetition based on two linked search space set within one CORESET is supported Agreement
For PDSCH rate matching around the scheduling DCI in the case of PDCCH repetition, the previous agreement for FR1 also applies to FR2.

Agreement
For number of BDs corresponding to two PDCCH candidates that are linked for PDCCH repetition, support
  UE reports one [or more] number(s) as required number of BDs for the two PDCCH candidates
  Candidate values: 2, 3.

Agreement
If a PDSCH is scheduled by a DCI in PDCCH candidates (the first PDCCH candidate associated with a first CORESET and the second PDCCH candidate associated with a second CORESET) that are linked for repetition,
  Working assumption: The UE expects the same configuration for the first and second CORESETs wrt presence of TCI field in DCI.
  If the TCI field is not present in the DCI, and the scheduling offset is equal to or larger than timeDurationForQCL if applicable, PDSCH QCL assumption is based on the CORESET with lower ID among the first and second CORESETs
  FFS: Whether additional options are needed (e.g. to enable SDM/FDM/TDM PDSCH schemes w/o TCI field in the DCI)

One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).

In NR Rel-15, beamforming technology are adopted to conquer the high power penetration in high frequency band, e.g. above 6 GHz. Hence, gNB and UE may both use some transmission beams and/or receiving beams to make high throughput data in such high frequency band reliable. How to choose suitable transmission beam and/or receiving beam has played an important role in NR Rel-15. Beam indication for various channels and reference signals are also well discussed and captured in specification along with the development of NR.

Nonetheless, in NR Rel-15, beam indication for receiving downlink (DL) transmission only considers transmission from a single TRP and/or using panel within a time duration (e.g. one slot or mini-slot), at least from perspective of UE. In NR Rel-16, people and companies resume to consider DL transmission from multiple TRPs and/or panels. For transmission from multiple TRP and/or panel, it may imply that a single DL transmission may be performed by different beam from multiple TRP and/or panel. It may also mean that UE may receive multiple DL transmission from multiple TRP and/or panel within a time duration (e.g. one slot or mini-slot). In NR Rel-16, enhancement to Ultra-Reliable Low-Latency Communication (URLLC) with consideration of multiple TRP scenario has been also made. Hence, there are some Physical Downlink Shared Channel (PDSCH) repetition schemes to improve reliability of receiving PDSCH. Some examples could be Spatial Domain Multiplexing (SDM) repetition scheme, FMD repetition scheme, mini-slot based repetition scheme and slot based repetition scheme.

Regarding NR Rel-17, people start to consider reliability enhancement of other channels, for example, PDCCH, Physical Uplink Control Channel (PUCCH) and PUSCH. Since PDCCH control scheduling information of PDSCH and PUSCH, there is no doubt that the enhancement of PDCCH should be emphasized first. To achieve reliability of PDCCH, one or more PDCCH repetition (from different TRP) on time domain could be one approach. In this approach, once one between TRP and UE is blockage and result in failed PDCCH reception, there are another PDCCH repetition from same or different TRP for successfully scheduling. The one or more PDCCH repetition may provide same scheduling result for PDSCH or PUSCH. A number of the one or more PDCCH repetition is two (considering two PDCCH repetition as one pair/association/linkage). In order to achieve beam diversity or soft-combining gain, UE needs to know linkage of the one or more PDCCH repetition before decoding.

RAN1 has agreed that association/linkage/pair of two PDCCH repetition by search space configuration. As for same carrier scheduling (PDCCH and PDSCH/PUSCH are on same carrier), network could provide configuration on linking two search spaces. Network could provide same periodicity, slot offset, same number of consecutive slot duration, and/or same number of monitoring occasion within a slot. However, as for cross-carrier scheduling, how network provides configuration for linking two search space of scheduled cell may need further study.

For example, in FIG. 11, UE is configured with cross-carrier/cell scheduling and PDCCH repetition for scheduled cell simultaneously. For intra-slot PDCCH repetition for reducing latency, and increasing reliability, SS1 and SS2 of scheduled cell shall be illustrated as in FIG. 11. However, with introduction of cross-carrier/cell scheduling, PDCCH monitoring occasion for SS of scheduled slot may depends on scheduling cell. In this example, benefit of reducing latency may be lost as SS2 of scheduling cell is in a different slot than SS1 of scheduling cell.

In one embodiment, when PDCCH repetition is configured or linked on scheduling cell or scheduled cell, this invention designs impacts on scheduled cell or scheduling cell, respectively. When a scheduling cell is associated with more than one scheduled cell (e.g., one scheduling cell cross-carrier more than one scheduled cell), this invention could provide PDCCH repetition design. One scheduling cell could associate to one or more Transmission Configuration Indication (TCI) states associated with at least the one scheduling cell with a first Physical Cell Identity (PCI) and/or an associated neighboring cell (or non-serving cell1 with a second PCI. Source Reference Signal (RS) of one TCI state of the one or more TCI states could associate to the one scheduling cell with the first PCI or the associated neighboring cell with the second PCI.

In one embodiment, when UE is configured with cross-carrier/cell scheduling and both scheduling cell and scheduled cell are configured with PDCCH repetition, one issue may happen even guarantee one-to-one mapping between one search space of scheduling cell and another search space of scheduling cell. This issue can be illustrated by FIG. 12. As shown in FIG. 12, UE is configured with SS1~SS3 of cell1 and SS1~SS2 of cell2, and is configured with cross-carrier/cell scheduling that cell1 scheduling cell2. FIG. 12 illustrates one slot of cell1. UE is configured with linkage of SS1 and SS3 of cell1 and linkage of SS1 and SS3 of cell2. Although PDCCH monitoring occasion(s) derived by SS1 and SS3 could have one-to-one mapping, SS1 of cell2 may be associated with SS1 of cell1, the second PDCCH monitoring occasion of SS1 of cell1 may associate second PDCCH monitoring occasion of SS1 of cell2 which may have none linked SS2. It may cause whether UE assumes there is PDCCH repetition or linkage of SS1, SS2 of cell2 or not, and/or whether UE assumes more BD attempts for one pair of PDCCH candidates (e.g., BD=3) than just decode separately (e.g., BD=2).

In one embodiment, a scheduling cell could refer to a SCell or a PCell. A scheduled cell could refer to a PCell or a Scell. DSS scenario for SCell scheduling PCell could be one addressed scenario. For a scheduled cell being cross-cell/carrier scheduled by a scheduling cell, the UE does not receive PDCCH on the scheduled cell.

Any combination of above concepts can be jointly combined or formed to a new embodiment. The following embodiments can be used to solve at least (but not limited to) the issue mentioned above.

Concept1:

In general, this concept is to restrict network for providing search space configuration for/of scheduling cell and scheduled cell (when network provides or configures a UE with cross-carrier/cell scheduling). In one embodiment, for linking of two search spaces of scheduled cell, UE expects limited/restricted configuration for two search spaces of scheduling cell (from network). UE may not be provided linking of two search spaces of scheduling cell. Alternatively, UE could be provided or network could provide flexible configuration for two search spaces of scheduling cell except configuration impact from linking of two search spaces of scheduled cell. Another alternative is that UE could (also) be provided limited/restricted configuration for two search spaces of scheduling cell if linking of two search spaces of scheduled cell is provided/configured, and/or UE expects linking of two search spaces of scheduling cell if linking of two search spaces of scheduled cell is provided/configured.

Alternatively, for linking of two search spaces of scheduling cell, UE could expect limited/restricted configuration for two search spaces of scheduling cell (from network). As for two search spaces of scheduled cell, one alternative is that UE may not be provided linking of two search spaces of scheduled cell and/or network could provide "not linking" of two search spaces of scheduled cell. As for two search spaces of scheduled cell, another alternative is that UE may (also) be provided limited/restricted configuration for two search spaces of scheduled cell if linking of two search spaces of scheduled cell is provided/configured. UE could expect linking of two search spaces of scheduled cell if linking of two search spaces of scheduling cell is provided/configured.

In one embodiment, for linking of two search space of scheduled cell, network may provide same first set of parameters for two search spaces of scheduled cell and same second set of parameters for two search spaces of scheduling cell. For linking of two search space of scheduled cell, network may provide a third set of parameters for two search spaces of scheduling cell with same number of bit position of value 1.

A/The first set of parameters may comprise a number of PDCCH candidates for one or more aggregation level (e.g., nrofCandidates). A/The second set of parameters may comprise at least monitoringSlotPeriodicityAndOffset, duration, monitoringSymbolsWithinSlot, and searchSpaceType. In one embodiment, the second set of parameters may (further) comprise CORESET related parameters. CORESET related parameters could be associated with one or two search spaces of scheduling cell. CORESET related parameters may comprise CORESET ID and/or number of TCI bits in DCI on the CORESET (e.g., tci-PresentInDCI and/or tci-PresentDCI-1-2-r16). A/The third set of parameters may comprise a bit-map with one or more bit positions with value 1 for indicating starting OFDM symbol of the one or more PDCCH monitoring occasion (e.g., monitoringSymbolsWithinSlot).

In one embodiment, if the network does not link two search spaces of scheduling cell, the network could provide different first set of parameters for two search spaces of scheduling cell.

In one embodiment, for a SS of a scheduled cell, a SS of a scheduling cell with same SS ID of the SS of the scheduled cell may refer to or mean a corresponding SS.

In one embodiment, PDCCH candidate ID could refer to an ID of a PDCCH candidate for an aggregation level in a search space (set). For example, UE has provided with SS1 of cell1, and SS1 of cell1 comprises 4 PDCCH candidates with AL=2, and PDCCH candidate could be 0-3 for AL=2 of SS1 of cell1.

In one embodiment, for cross-carrier/cell scheduling, scheduling cell and scheduled cell could be different (serving) cell, and/or with different PCI and/or associated with different serving cell ID (ServCellIndex).

In one embodiment, a corresponding search space of scheduling cell for a search space of scheduled cell may be determined by a same SS ID.

In one embodiment, when a UE is configured with cross-carrier/cell scheduling, PDCCH monitoring occasion(s) of a search space of scheduled cell is determined by search space of scheduling cell, wherein search space of scheduling cell is with same SS ID with search space of scheduled cell.

For cross-carrier/cell scheduling and two linked search space of scheduled cell, limited/restricted configuration for two corresponding search spaces (i.e. having same set of parameters or same value of following parameter(s)) may comprise any one or combination of following:

- same number of bit position with value 1 in monitoring-SymbolsWithinSlot
- same slot level monitoring periodicity
- same slot offset for monitoring
- same duration
- same search space type
- same DCI format (functionality)
- same searchSpaceGroupIdList
- same freqMonitorLocations
- different CORESET ID for the two corresponding search spaces
- (Each) CORESET for the two corresponding search spaces being provided same number of tci-PresentInDCI
- (Each) CORESET for the two corresponding search spaces being provided same number of tci-PresentInDCI tci-PresentDCI-1-2-r16

Limited/restricted configuration for two corresponding search spaces may assist UE to avoid handling orphan PDCCH monitoring occasion and/or ambiguity on whether the two linked SS of scheduled cell is linked or not. For cross-carrier/cell scheduling and two linked search space of scheduled cell, at least number of PDCCH candidates (for each aggregation level) for search space of scheduling cell with same SS ID as the two linked search space of scheduled cell could have different values.

In short, no matter/regardless of whether two linked search space is from cell1 or cell2 (e.g., scheduling cell/scheduled cell), UE could expect being configured with two search spaces with the same first set of parameters if UE may perform soft-combining for PDCCH from search space 1 of scheduled cell and PDCCH from search space 2 of scheduled cell. UE may not perform soft-combining for PDCCH from search space 1 of scheduling cell and PDCCH from search space 2 of scheduling cell.

In one embodiment, for two search spaces of scheduling cell, which the two search spaces are linked for PDCCH repetition, one or two CORESETs could be associated with the two search spaces of scheduling cell, respectively. The one or two CORESETs could be associated with different TRPs. The one or two CORESETs could be associated with different CORESETPoolIndex. The one or two CORESETs could be associated with different TCI states/beams/spatial relations/QCL type-D assumptions/spatial filters.

In one embodiment, source RS of the different TCI states/beam/spatial relations/QCL type-D assumptions/spatial filters may associate with different cell with different PCI. One scheduling cell may associate with one or more TCI states, wherein source RS of the one or more TCI states could be associated with one or more cells with different PCIs.

In one embodiment, linking/link/linkage/association/pair of two search space (set) could refer to or could mean PDCCH repetition. UE could be configured with linking/link/linkage/association/pair of two search space (set) of a cell (e.g., SS1, SS2) by receiving a SS ID pointing or associating to another SS ID. Linking/link/linkage/association/pair of two search space (set) may refer to or mean that PDCCH1 from one of the two search space (set) is linking/linked/associated/paired to PDCCH2 from the other of the two search space (set).

In one embodiment, PDCCH1 and PDCCH2 (which are linked/associated) may have the same CCEs and/or the same starting CCE. SS1 and SS2 (of a cell1 being linked may refer to or imply that PDCCH (candidate) with a PDCCH candidate ID from SS1 is linked to PDCCH (candidate) with the PDCCH candidate ID from SS2. PDCCH1 and PDCCH2 (which are linked/associated) may have the same PDCCH candidate ID. PDCCH1 and PDCCH2 could be separated in time domain (TDM), frequency domain (FDM), or spatial domain (SDM).

In one embodiment, CORESET for PDCCH1 could be separated from CORESET for PDCCH2 in time domain or in frequency domain or in spatial domain. CORESET for PDCCH1 may be partially overlapped with CORESET for PDCCH2 in time domain, frequency domain, and/or spatial domain. PDCCH monitoring occasion for PDCCH1 could be separated from PDCCH monitoring occasion for PDCCH2 in time domain, frequency domain, or spatial domain. PDCCH monitoring occasion for PDCCH1 may be partially overlapped with PDCCH monitoring occasion for PDCCH2 in time domain, frequency domain, and/or spatial domain. PDCCH1 and PDCCH2 could be a pair of PDCCH candidates. PDCCH1 could be associated with a different TRP than PDCCH2. PDCCH1 could be associated with a different CORESETPoolIndex than PDCCH2. PDCCH1 could be associated with a different CORESET than PDCCH2. PDCCH1 could be associated with a different TCI state/beam/spatial relation/QCL type-D assumption/spatial filter than PDCCH2.

In one embodiment, source RS of TCI state/beam/spatial relation/QCL type-D assumption/spatial filter associated with PDCCH1 could be different than source RS of TCI state/beam/spatial relation/QCL type-D assumption/spatial filter associated with PDCCH2. Source RS of TCI state/beam/spatial relation/QCL type-D assumption/spatial filter associated with PDCCH1 may be associated with a different PCI of cell than source RS of than TCI state/beam/spatial relation/QCL type-D assumption/spatial filter associated with PDCCH2.

In one embodiment, for a pair of PDCCH candidates (e.g., PDCCH1 and PDCCH2 are paired or linked for PDCCH repetition), UE may assume X blind decode attempts or X BDs. For non-pair of PDCCH candidates (e.g., PDCCH1 and PDCCH2 are not paired or linked for PDCCH repetition), UE may assume Y blind decode attempts or Y BDs. X may be larger than or equal to Y. UE may report value of X to a network. Y may be 2. X may be 2 or 3.

In one embodiment, for a pair of PDCCH candidates comprising PDCCH1 and PDCCH2, PDCCH1 and PDCCH2 could schedule a same Physical Downlink Shared Channel (PDSCH). For example, in FIG. 10, 1 and 2 are linked search space, both PDCCH1, PDCCH2 from the linked search space, respectively schedules the two PDSCHs.

For a pair of PDCCH candidates comprising PDCCH1 and PDCCH2, PDCCH1 and PDCCH2 could schedule a same Physical Uplink Shared Channel (PUSCH). PDCCH1 and PDCCH2 could indicate a same Physical Uplink Control Channel (PUCCH). PDCCH1 and PDCCH2 could indicate a same uplink scheduling and/or downlink assignment.

In one embodiment, for a pair of PDCCH candidates comprising PDCCH1 and PDCCH2, one reference PDCCH may be determined from PDCCH1 or PDCCH2. The one reference PDCCH may be a latter PDCCH in time domain (for determining timing related aspect). The one reference PDCCH may be an earlier PDCCH in time domain (for determining counter DAI, codebook determination). The one reference PDCCH may be a PDCCH with lowest/highest CORESET ID or associated with lowest/highest SS ID (at least for determining beam or QCL relation for scheduled PDSCH).

In one embodiment, for a pair of PDCCH candidates comprising PDCCH1 and PDCCH2, UE may perform soft-combining for the pair of PDCCH candidates. For non-pair of PDCCH candidates, UE may not perform soft-combining for two PDCCH candidates.

Regardless of/no matter linkage or link is provided on two search spaces of scheduling cell or scheduled cell or both, UE could expect limited/restricted configuration for two search space of scheduling cells. UE could expect the second set of parameters and the third set of parameters is limited or restricted. UE could expect the second set of parameters and the third set of parameters for two search spaces of scheduled cell is limited or restricted.

When/upon/if UE is configured with or provided that SS1 and SS2 of scheduled cell are linked, UE does not expect that a specific SS of scheduling cell which is different than SS2 of scheduling cell is configured/provided to link SS1. When/upon/if UE is configured with or provided that more than one scheduled cell is scheduled by a scheduling cell, for link of two search space of each scheduled cell, UE does not expect that each link search space of each scheduled cell has same or overlapping SS ID with each other.

For example, UE may be configured with cell1 schedules cell1 (e.g., CIF=0), cell2 (e.g., CIF=1), cell3 (e.g., CIF=2). UE may be configured with or provided that link of two search space of cell2 and link of two search space of cell3. In this example, UE may not expect that (SS1, SS2) of search space of cell2 is linked and (SS1, SS3) of search space of cell3 is linked. UE could expect that (SS1, SS2) and (SS3, SS4) (since none of SS ID is repeated from different scheduled cell). One possible reason could be that SS1 may refer to SS1 in cell1 and limited/restricted configuration may be applied for SS1 and SS2 and even SS1 and SS3, which may reduce network's scheduling flexibility.

Alternatively, for self-carrier/cell scheduling, UE may not expect that a third search space of a cell to link any one of search space from a link of two search space of the cell. As for cross-carrier/cell scheduling and more than one scheduled cells are scheduled by a scheduling cell, for link of two search space of each scheduled cell, UE could receive a configuration that the search space of scheduling cell may implicitly link to more than one search spaces of scheduled cell. For example, UE could be configured with cell1 schedules cell1 (e.g., CIF=0), cell2 (e.g., CIF=1), cell3 (e.g., CIF=2). UE may be configured with or provided that link of two search space of cell2 and link of two search space of cell3. In this example, (SS1, SS2) of cell2 and (SS1, SS3) of cell3 is allowed. In other words, SS1 of cell1 (scheduling cell1 may have limited/restricted second set of parameters and/or third set of parameters to SS2 of cell1 and SS3 of cell1.

Figure 8:
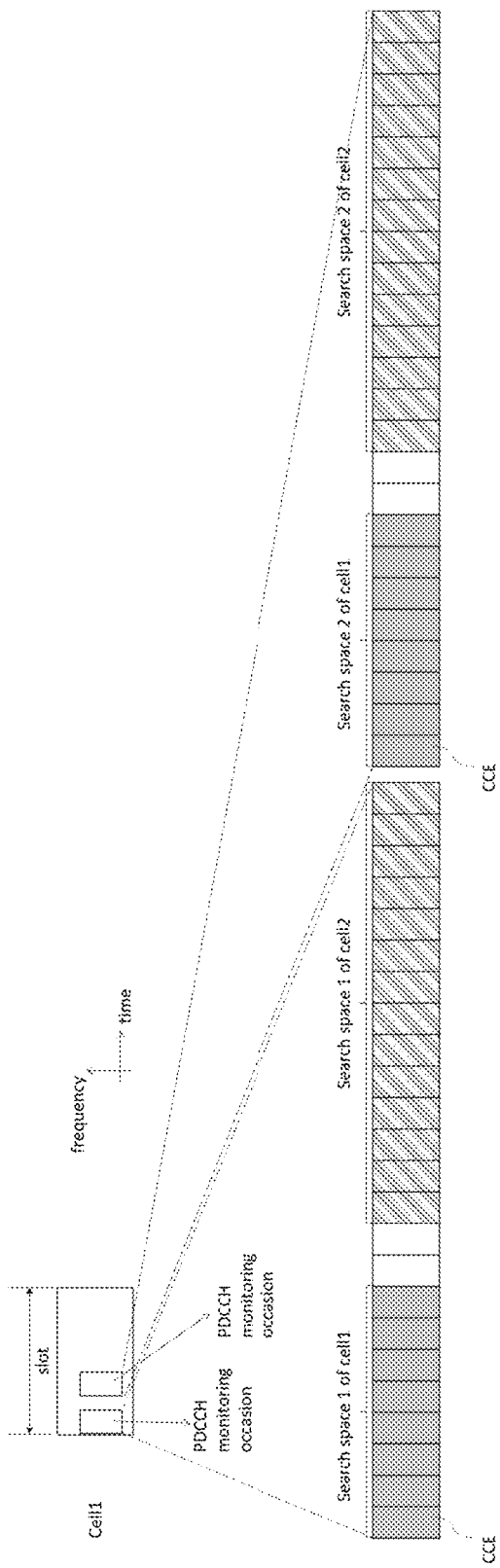
FIG. 8 is a diagram according to one exemplary embodiment.

FIG. 8 illustrates an example with two PDCCH monitoring occasions in time and/or frequency domain and Control Channel Element (CCE) domain of search space (SS) for cell1 and cell2 in each PDCCH monitoring occasion in Control Channel Element (CCE) domain. UE could be configured with cross-carrier/cell scheduling (e.g., PDCCH in cell1 could schedule PDSCH/PUSCH in cell2). In other words, UE could monitor a PDCCH on cell1, and the PDCCH from search space of cell2 schedules PDSCH/PUSCH on cell2. The same SS ID of search space of cell1 and cell2 may refer to one or more same PDCCH monitoring occasion(s) based on search space of cell1. In this example, SS ID 1 of cell1 and cell2 could refer to the first PDCCH monitoring occasion, while SS ID 2 of cell1 and cell2 could refer to the second PDCCH monitoring occasion. Since PDCCH monitoring occasion for SS of scheduled cell (e.g., cell2) is based on search space configuration of scheduling cell (e.g., cell1), when/upon UE is provided linkage of search space 1 and search space 2 of cell2, UE could expect some limited configuration on respective search space of cell1 (same set of parameters or same value of parameter(s)). In this example, although linkage of SS is (mainly) for scheduled cell (e.g., cell2), UE could expect SS configuration of scheduling (e.g., SS 1 and SS 2 of cell1) to provide linked monitoring occasion in a slot. As another example, (when/upon UE is configured with cross-cell/carrier scheduling and two linked search space of scheduled cell), UE may not expect that SS configuration of two search space of scheduling cell with same SS ID as the two linked search space of scheduled cell providing orphan PDCCH monitoring occasion.

FIG. 9 illustrates an example with PDCCH from SS1, SS2 or cell1, cell2 considering two scenarios that SS1 and SS2 of cell1 are linked or SS1 and SS2 of cell2 are linked. UE could be provided with cross-carrier/cell scheduling where cell1 schedules cell2 and cell1 schedules cell1. Blind decode (BD) number X could be larger than or equal to Y. Preferably, X is 2 or 3, and Y is 2.

In this example (left up entry), once UE is provided that SS1 and SS2 of cell1 are linked, for SS1, SS2 of cell1, UE may assume or expect (it forces) SS1 and SS2 of cell1 being linked. UE may assume X BDs for one pair of PDCCH (candidate) from SS1, SS2 of cell1, respectively. PDCCH1/PDCCH candidate1 could have a same number of CCEs and a same starting CCE as PDCCH2/PDCCH candidate2. PDCCH1 could be associated with SS1 of cell2 and PDCCH2 is associated with SS2 of cell1. PDCCH1 could have a same PDCCH candidate ID as PDCCH2.

In one embodiment, UE could perform soft-combining for the two PDCCHs (e.g., PDCCH1 and PDCCH2 in this example). PDCCH1 and PDCCH2 could schedule one or more same PDSCH. UE may consider PDCCH1 and PDCCH2 are linked PDCCH. PDCCH1 and PDCCH2 could have a same DCI format. SS1 of cell2 and SS2 of cell1 could be associated with same DCI format, same search space type, same duration, and/or same number of bit location with value 1 in each bit-map. SS1 of cell1 and SS2 of cell1 could be associated with same nrofCandidates (for each aggregation level).

In this example (left down entry), once UE is provided that SS1 and SS2 of cell1 are linked, for SS1, SS2 of cell2, one alternative (alt1) is that UE may assume or expect (it forces) SS1 and SS2 of cell2 being linked. UE may assume X BDs for one pair of PDCCH (candidate) from SS1, SS2 of cell2, respectively. PDCCH1/PDCCH candidate1 may have a same number of CCEs and a same starting CCE as PDCCH2/PDCCH candidate2. PDCCH1 could be associated with SS1 of cell2, and PDCCH2 could be associated with SS2 of cell2. PDCCH1 may have a same PDCCH candidate ID as PDCCH2. UE could perform soft-combining for the two PDCCHs (e.g., PDCCH1 and PDCCH2 in this example). PDCCH1 and PDCCH2 could schedule one or more same PDSCH. UE may consider PDCCH1 and PDCCH2 as linked PDCCH. PDCCH1 and PDCCH2 may have the same DCI format. One or more limited configuration for SS1, SS2 of cell1 and/or CORESET of cell1 could be applied to SS1 of cell2 and SS2 of cell2. SS1 of cell2 and SS2 of cell2 could be have the same DCI format, same search space type, same duration, and/or same number of bit location with value 1 in each bit-map. SS1 of cell2 and SS2 of cell2 could be associated with same nrofCandidates (for each aggregation level).

In this example (left down entry), once UE is provided that SS1 and SS2 of cell1 are linked, for SS1, SS2 of cell2, another alternative (alt2) is that UE may not be linked to independent SS1, SS2 of cell2. UE may assume Y BDs for one pair of PDCCH (candidate) from SS1, SS2 of cell2, respectively. PDCCH1/PDCCH candidate1 could have a same number of CCEs and a same starting CCE as PDCCH2/PDCCH candidate2. PDCCH1 could be associated with SS1 of cell2, and PDCCH2 could be associated with SS2 of cell2. PDCCH1 could have same PDCCH candidate ID as PDCCH2. UE may not perform soft-combining for the two PDCCHs (e.g., PDCCH1 and PDCCH2 in this example). PDCCH1 and PDCCH2 may schedule different PDSCHs. UE may consider PDCCH1 and PDCCH2 as independent PDCCH. PDCCH1 and PDCCH2 could have the same DCI format. One or more limited configuration for SS1, SS2 of cell1 and/or CORESET of cell1 could be applied to SS1 of cell2 and SS2 of cell2 (even SS1, SS2 of cell2 are not linked). SS1 of cell2 and SS2 of cell2 could have the same DCI format, same search space type, same duration, and/or same number of bit location with value 1 in each bit-map. SS1 of cell2 and SS2 of cell2 could be provided with different nrofCandidates (for each aggregation level).

In this example (right up entry), once UE is provided that SS1 and SS2 of cell2 are linked, for SS1, SS2 of cell1, one alternative (alt1) is that UE may assume or expect SS1 and SS2 of cell1 being linked. UE may assume X BDs for one pair of PDCCH (candidate) from SS1, SS2 of cell1, respectively. PDCCH1/PDCCH candidate1 may have same number of CCEs and same starting CCE as PDCCH2/PDCCH candidate2. PDCCH1 could be associated with SS1 of cell1, and PDCCH2 could be associated with SS2 of cell1. PDCCH1 may have a same PDCCH candidate ID as PDCCH2. UE could perform soft-combining for the two PDCCHs (e.g., PDCCH1 and PDCCH2 in this example). PDCCH1 and PDCCH2 could schedule one or more same PDSCH. UE may consider PDCCH1 and PDCCH2 are linked PDCCHs. PDCCH1 and PDCCH2 could have the same DCI format. One or more limited configuration for SS1, SS2 of cell1 and/or CORESET of cell1 could be expected by UE. SS1 of cell1 and SS2 of cell1 could have the same DCI format, same search space type, same duration, and/or same number of bit location with value 1 in each bit-map. SS1 of cell1 and SS2 of cell1 could be associated with the same nrofCandidates (for each aggregation level).

In this example (right up entry), once UE is provided that SS1 and SS2 of cell1 are linked, for SS1, SS2 of cell1, another alternative (alt2) is that UE could be provided independent SS1, SS2 of cell1. UE may assume Y BDs for one pair of PDCCH (candidate) from SS1, SS2 of cell2, respectively. PDCCH1/PDCCH candidate1 may have a same number of CCEs and a same starting CCE as PDCCH2/PDCCH candidate2. PDCCH1 could be associated with SS1 of cell1, and PDCCH2 could be associated with SS2 of cell1. PDCCH1 may have same PDCCH candidate ID as PDCCH2. UE may not perform soft-combining for the two PDCCHs (e.g., PDCCH1 and PDCCH2 in this example). PDCCH1 and PDCCH2 may schedule different PDSCHs. UE may consider PDCCH1 and PDCCH2 as independent PDCCH. PDCCH1 and PDCCH2 could have the same DCI format. One or more limited configuration for SS1, SS2 of cell1 and/or CORESET of cell1 could be applied to SS1 of cell2 and SS2 of cell2 (even if SS1, SS2 of cell2 are not linked). SS1 of cell2 and SS2 of cell2 are associated to same DCI format, same search space type, same duration, and/or same number of bit location with value 1 in each bit-map. SS1 of cell2 and SS2 of cell1 could be provided with different nrofCandidates (for each aggregation level).

In this example (right down entry), once UE is provided that SS1 and SS2 of cell2 are linked, for SS1, SS2 of cell2, UE may assume or expect SS1 and SS2 of cell2 to be linked. UE may assume X BDs for one pair of PDCCH (candidate) from SS1, SS2 of cell2, respectively. PDCCH1/PDCCH candidate1 could have a same number of CCEs and a same starting CCE as PDCCH2/PDCCH candidate2. PDCCH1 could be associated with SS1 of cell2, and PDCCH2 could be associated with SS2 of cell2. PDCCH1 could have a same PDCCH candidate ID as PDCCH2. UE could perform soft-combining for the two PDCCHs (e.g., PDCCH1 and PDCCH2 in this example). PDCCH1 and PDCCH2 could schedules one or more same PDSCH. UE may consider PDCCH1 and PDCCH2 as linked PDCCH. PDCCH1 and PDCCH2 could have the same DCI format. SS1 of cell2 and SS2 of cell1 could have the same DCI format, same search space type, same duration, and/or same number of bit location with value 1 in each bit-map. SS1 of cell1 and SS2 of cell2 could be associated with the same nrofCandidates (for each aggregation level).

In one embodiment, different alternatives shown in FIG. 9 could be combined. For example, once SS1 and SS2 of cell1 are linked, SS1 and SS2 of cell2 are linked (Alt1), while once SS1 and SS2 of cell2 are linked, SS1 and SS2 of cell1 may not be linked (Alt2) (but with providing one or more limited configuration supporting linkage SS1 and SS2 of cell2). As another example, it may be vice versa that once SS1 and SS2 of cell1 are linked, SS1 and SS2 of cell2 are not linked (Alt2), while once SS1 and SS2 of cell2 are linked, SS1 and SS2 of cell1 is linked (Alt1). As another example, once SS1 and SS2 of cell1 are linked, SS1 and SS2 of cell2 are linked (Alt1), while once SS1 and SS2 of cell2 are linked, SS1 and SS2 of cell1 are linked (Alt1). In other words, at least one scheduling cell (e.g., cell1) or scheduled cell (e.g., cell2) is provided with linkage of two SS, both two SS from scheduling cell or from scheduled cell and two SS with same SS ID from scheduled cell or from scheduling cell are linked.

Concept2:

In general, this concept is to restrict network to simultaneously configure cross-carrier/cell scheduling and linking/link/linkage/association/pair of two search spaces (of a scheduling cell and/or of a scheduled cell). When a UE is configured with a first cell scheduling a second cell, the UE may not expect that PDCCH repetition or linking/link/linkage/association/pair of two search spaces of the first cell or the second cell. This concept could be that restricting network not to configure linking/link/linkage/association/pair of two search spaces of a scheduled cell (which PDCCH is on another scheduling cell). This concept could be that restricting network not to configure linking/link/linkage/association/pair of two search spaces of a SCell. In one embodiment, network may only be allowed to configure PCell or PSCell with linking/link/linkage/association/pair of two search spaces. PCell and/or PSCell may not be scheduled cells which PDCCH is on another scheduling cell (e.g., UE-specific PDCCH scheduling PCell and/or PSCell are not on other cell).

Concept3:

In general, this concept is to (explicitly) associate a first link of two search spaces of scheduled cell to a second link of two search spaces of scheduling cell (when providing/configuring linking of two search spaces of scheduled cell). The UE may not expect that the first link is associated to one or more search spaces of scheduling without configuring/providing link. PDCCH monitoring occasion of the first link of two search spaces of scheduled cell could be determined based on the second link of two search spaces of scheduling cell (, respectively). PDCCH monitoring occasion of the first link of two search spaces of scheduled cell may not be determined based on implicitly SS ID of search spaces of scheduling cell which the SS ID is the same as the first link of two search spaces of scheduled cell.

Alternatively, implicitly association for a first link of two search spaces of scheduled cell to a second link of two search spaces of scheduling cell may be applied (when providing/configuring linking of two search spaces of scheduled cell). Scheduling cell may have a first number of links of two search spaces of scheduling cell and scheduled cell has a second number of links of two search spaces of scheduled cell. The first number of links could be associated with the second number of links (rather than via using same SS ID). Association between the first number of links and the second number of links may be one-to-one, or one-to-many. The first link of the second number of links could be associated with the first link of the first number of links. Link ID (for each link) could be configured or implicitly determined by lowest SS ID among the two SS of a link.

For example, UE could be configured such that cell1 schedules cell1 (e.g., CIF=0), cell2 (e.g., CIF=1). UE could be configured with three links of SS of cell1 as (SS1, SS4), (SS2, SS5), (SS6, SS7), and five links of SS of cell2 (SS2, SS3), (SS5, SS6), (SS8, SS9), (SS4, SS7), (SS1, SS10). In this example, (SS2, SS3), (SS5, SS6), (SS8, SS9), (SS4, SS7), (SS1, SS10) could wrap around the three links of SS of cell1, such that (SS1, SS4) of cell1 could be associated with (SS2, SS3), (SS4, SS7) of cell2 (SS2, SS5) could be associated with (SS5, SS6) and (SS1, SS10) of cell2, and (SS6, SS7) could be associated with (SS8, SS9). Alternatively, the three links of SS of cell1 may be re-ordered by lowest SS ID of each link as (SS1, SS4), (SS2, SS5), (SS6, SS7), and the five links of SS of cell2 may be re-ordered by lowest SS ID of each link as (SS1, SS10), (SS2, SS3), (SS4, SS7), (SS5, SS6), (SS8, SS9). The first two links among the three links of cell1 may refer to or associate with two links of cell2. Preferably, (SS1, SS4), (SS2, SS5), (SS6, SS7) of cell1 may refer to link ID as 0, 1, 2, and (SS2, SS3), (SS5, SS6), (SS8, SS9), (SS4, SS7), (SS1, SS10) may refer to link ID as 0, 1, 2, 3, 4.

In one embodiment, for two search space of a cell being linked, both two search spaces are associated to a same link ID. For cross-carrier scheduling, same link ID of scheduled cell and scheduling cell are also linked. Association of the five links of SS and the three links of SS could be determined based on at least modulation of the number of link ID of the scheduling cell, and the remainder refers to the associated link of scheduled cell.

Concept4:

In general, this concept is that one linkage of two search spaces of scheduled cell is considered as one linkage of two search spaces of scheduling cell (when UE is configured with cross-carrier/cell scheduling and PDCCH repetition on scheduled cell). In other words, when (SS1, SS2) of scheduled cell is configured with linkage, UE may consider or derive or determine that (SS1, SS2) of scheduled cell is (also) a (SS1, SS2) linkage of scheduling cell. As for scheduling cell, UE could expect or network could be restricted to provide or configure one-to-one search space in a link (e.g., PDCCH repetition or linkage of two search spaces shall guarantee that there is no another search space being linked to any one of linkage of two search spaces). This concept could be that (for cross-carrier/cell scheduling,) SS IDs of SSs in a link of search spaces of scheduling cell or scheduled cell are fully overlapped, fully the same, non-overlapped, and/or totally different with SS IDs of SSs in another link of search spaces of any scheduling cell or scheduled cell. Any one linkage of two search spaces, no matter from scheduling cell or scheduled cell, may be considered as one linkage of two search spaces with same SS IDs on scheduling cell.

(As for cross-carrier/cell scheduling), the UE may not expect to be configured with configuration that SS IDs of SSs in a link of search spaces of scheduling cell or scheduled cell is partially overlapped (but not fully overlapped) with SS IDs of SSs in another link of search spaces of any scheduling cell or scheduled cell.

(As for self-carrier/cell scheduling), the UE could be configured with configuration that SS IDs of SSs in a link of search spaces of a third cell or scheduled cell is partially overlapped with SS IDs of SSs in another link of search spaces of a fourth cell. The UE could monitor PDCCH on the third cell, and the PDCCH could schedule the third cell. The UE could monitor PDCCH on the fourth cell, and the PDCCH could schedule the fourth cell.

When one search space with a first SS ID of a scheduling cell and another one search space with a second SS ID of the scheduling cell is linked (for PDCCH repetition), UE may not expect search space with the first SS ID of a scheduled cell being configured to link with other search space of the scheduled cell other than search space with the second SS ID of the scheduled cell.

When one search space with a first SS ID of a scheduled cell and another one search space with a second SS ID of the scheduled cell is linked (for PDCCH repetition), UE may not expect search space with the first SS ID of a scheduling cell being configured to link with other search space of the scheduling cell other than search space with the second SS ID of the scheduling cell.

When one search space with a first SS ID of a scheduling cell and another one search space with a second SS ID of the scheduling cell is linked (for PDCCH repetition), UE may not expect search space with the first SS ID of any scheduled cell being configured to link with other search space of the any scheduled cell other than search space with the second SS ID of the any scheduled cell.

When one search space with a first SS ID of a first scheduled cell and another one search space with a second SS ID of the first scheduled cell is linked (for PDCCH repetition), UE may not expect search space with the first SS ID of a second scheduled cell being configured to link with other search space of the second scheduled cell other than search space with the second SS ID of the second scheduled cell. Both the first scheduled cell and the second scheduled cell could be (cross-carrier/cell1 scheduled by a same scheduling cell.

In one embodiment, a UE could be configured with cross-carrier/cell scheduling. UE could be configured with a first cell to cross-carrier/cell schedule one or more cells. The one or more cells may comprise a second cell. The UE could be configured with a first link of search space (set) of the first cell. The UE could be configured with a second link of search space (set) of the second cell. The UE could be configured with a second link of search space (set) of one cell of the one or more cells. In one embodiment, the first link of search space may comprise a first search space set with a first SS ID and a second search space set with a second SS ID. The second link of search space may comprise a third search space set with a third SS ID and a fourth search space set with a fourth SS ID. If the first SS ID is the same as the third or fourth SS ID, the UE may not expect that the second SS ID is different than the fourth or third SS ID (, respectively). If the first SS ID is the different that the third or fourth SS ID, the UE may not expect that the second SS ID is the same as the fourth or third SS ID.

For any link of search space of the first cell and any link of search space of the cell of the one or more cells comprising one search space with a first SS ID and the other search space with a second SS ID, the UE may not expect to be configured or to receive a configuration for another link of search space of the first cell or the cell of the one or more cells such that the another link of search space comprises search space with the first SS ID or the second SS ID and the other search space with SS ID being not the first SS ID or the second SS ID.

For any link of search space of the first cell and any link of search space of the cell of the one or more cells comprising one search space with a first SS ID and the other search space with a second SS ID, the UE may not expect to be configured or to receive a configuration for another link of search space of the first cell or the cell of the one or more cells such that the another link of search space comprises search space with SS ID different than the first SS ID or the second SS ID and the other search space with SS ID being the same as the second SS ID.

For example, as shown in FIG. 12, since SS1 of cell1 is linked to SS3 of cell1, UE does not expect that SS1 of cell2 is linked to other search spaces other than SS3. Since SS1 of cell2 is linked to SS2 of cell2, UE may not expect that SS1 of cell1 is linked to other search spaces other than SS2. In other words, SS1 of cell1 could be configured to link with SS2 of cell1, but SS1 of cell1 may not be allowed to be configured to link to SS3 of cell1.

Figure 14:
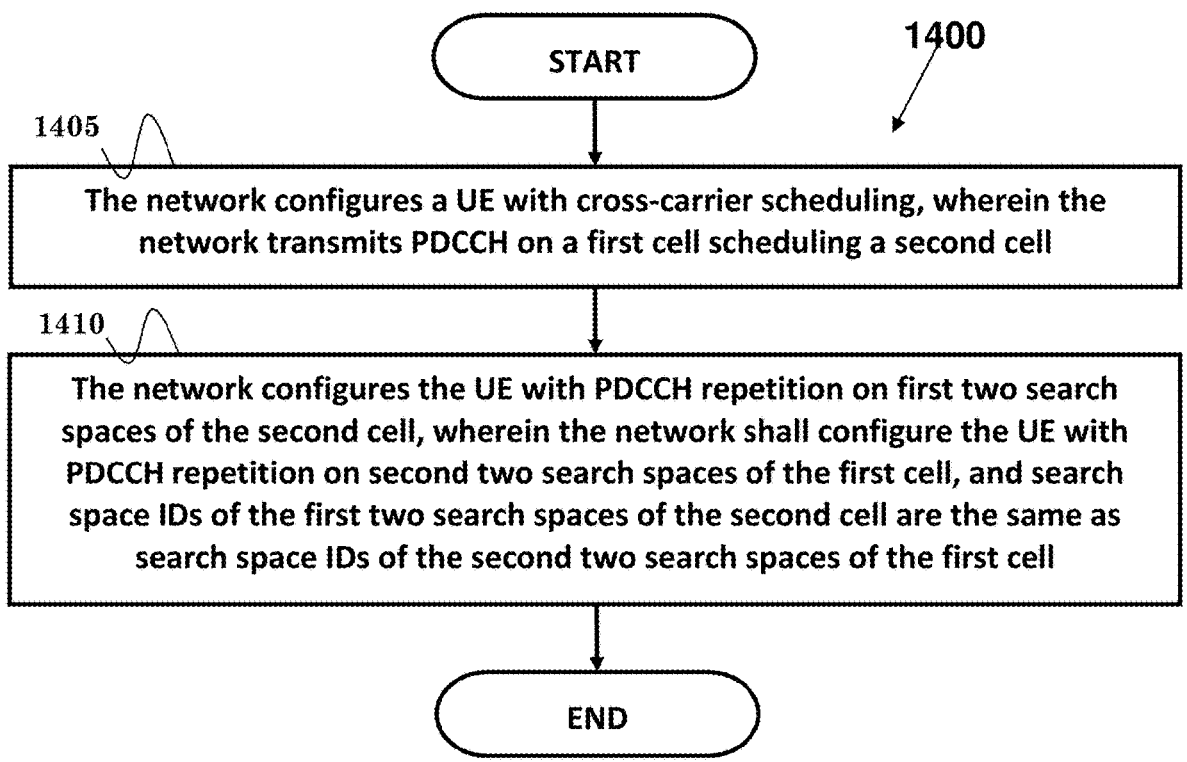
FIG. 14 is a flow chart according to one exemplary embodiment.

In one embodiment, as shown in FIG. 14, UE could be configured with cross-carrier/cell scheduling such that cell1 schedules cell1, cell2, and cell3. In this example, (SSx, SSy) of cell1 could be configured to link for PDCCH repetition, (SSz, SSw) of cell2 could be configured to link for PDCCH repetition, and (SSq, SSe) of cell3 could be configured to link for PDCCH repetition. In this example, since it's PDCCH repetition, SS ID x could be different than SS ID y, SS ID z could be different than SS ID w, and SS ID q could be different than SS ID e.

Figure 13:
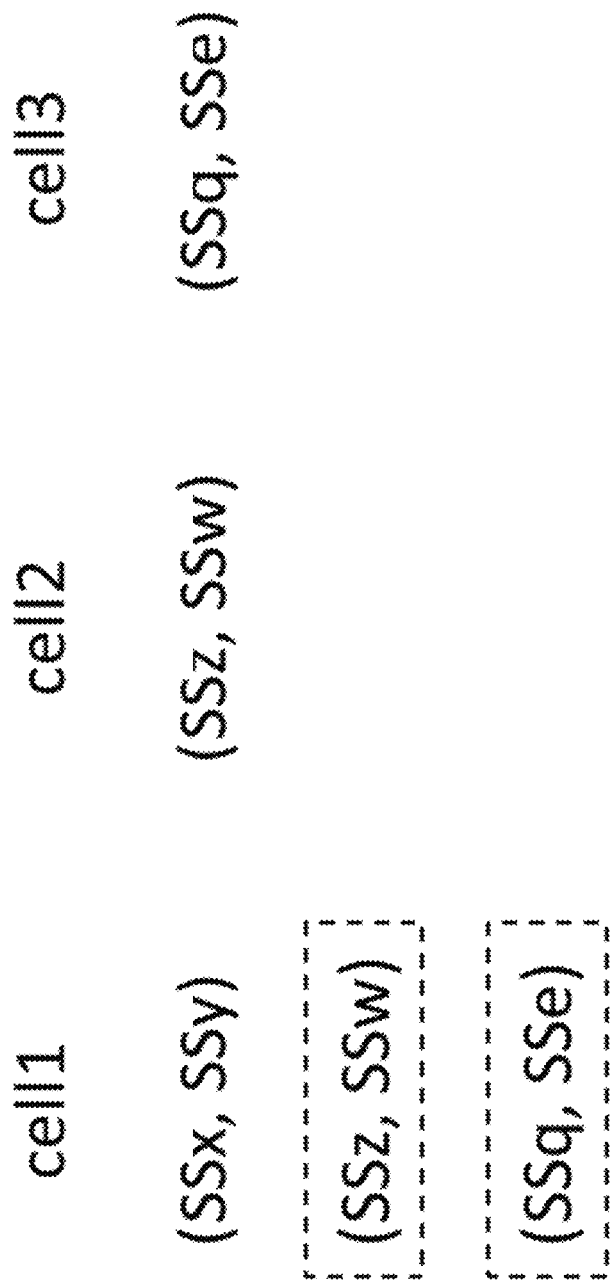
FIG. 13 is a diagram according to one exemplary embodiment.

In one embodiment, if x is equal to z or w, than y could be limited or restricted to be w or z respectively. If x is different than z or w, y could be limited or restricted to at least be different than z or w. If x is different than q or e, y could be limited or restricted to at least be different than q or e. In one embodiment, (x, y, z, w, q, e) could be (1, 2, 1, 2, 1, 2), (x, y, z, w, q, e) could be (1, 2, 1, 2, 3, 4), (x, y, z, w, q, e) could be (3, 4, 1, 2, 3, 4), and/or (x, y, z, w, q, e) could be (3, 1, 4, 2, 1, 3). As shown in FIG. 13, if x is different than z, UE may expect that SSz, SSw of cell1 have linkage or at least have limited/restricted configuration as illustrated in concept 1.

For all Above Concepts, Methods, Alternatives and Embodiments:

Any of above methods, alternatives, and embodiments may be combined or applied simultaneously. A cell could be associated with more than one PCI, e.g. including a first PCI and a second PCI. The first PCI could be indicated or derived from a (primary) synchronization signal and/or a (secondary) synchronization signal of the cell. The second PCI could be used for (inter-cell1 mTRP operation. A first TRP and a second TRP could be involved in the (inter-cell1 mTRP operation. The (QCL source/parameters of signal/channel from) first TRP could be associated with the first PCI and the (QCL source/parameters of signal/channel from) second TRP could be associated with the second PCI.

In one embodiment, a UE could be configured and/or served in a serving cell by a network. The UE could be configured with and/or could indicate one or more BWP. The UE could indicate and/or activate a (active), an active DL BWP, or an active UL BWP. The UE could be configured and/or could indicate an initial BWP.

In one embodiment, the first SS could be associated with a first TRP in a first serving cell. The second SS could be associated with a second TRP in a second serving cell. The first serving cell could be with serving cell index which could be the same or different than the serving cell index of the second serving cell.

In one embodiment, the UE may be in RRC_CONNECTED state, RRC_INACTIVE state, or RRC_IDLE state. The UE could be served by a first TRP or a second TRP. The first TRP may belong to or be associated with the serving cell. The second TRP may belong to or be associated with the serving cell. The first TRP and the second TRP could belong to or be associated with the same serving cell. Alternatively, the first TRP and the second TRP belongs to or be associated with different serving cells. The first TRP may schedule or transmit a DL or UL transmission to the UE. The second TRP may schedule or transmit a DL or UL transmission to the UE. The first TRP may receive UL transmission from the UE. The second TRP may receive UL transmission from the UE.

In one embodiment, the network may comprise a first network panel. The network may comprise a second network panel. The first network panel may be used to receive UL transmission from the UE. The second network panel may be used to receive UL transmission from the UE. The two different CORESETs may belong to the first TRP and the second TRP (, respectively). The one search space could be associated with one CORESET belonging to the first TRP and one CORESET belonging to the second TRP. The two different CORESETs may belong to same TRP either as the first TRP or the second TRP. As for the two search spaces, one of the two search space could be associated with CORESET belonging to the first TRP, and the other one of the two search space could be associated with CORESET belonging to the second TRP.

FIG. 14 is a flow chart 1400 according to one exemplary embodiment from the perspective of a network. In step 1405, the network configures a User Equipment (UE) with cross-carrier scheduling, wherein the network transmits Physical Downlink Control Channel (PDCCH) on a first cell scheduling a second cell. In step 1410, the network configures the UE with PDCCH repetition on first two search spaces of the second cell, wherein the network shall configure the UE with PDCCH repetition on second two search spaces of the first cell, and search space Identities (IDs) of the first two search spaces of the second cell are the same as search space IDs of the second two search spaces of the first cell.

In one embodiment, a first Physical Downlink Control Channel (PDCCH) candidate from one search space of the first two search spaces of the second cell could have a same PDCCH candidate identity (ID) as a second PDCCH candidate from the other search space of the first two search spaces of the second cell. The first PDCCH candidate could be associated with a different Transmission Configuration Indication (TCI) state, beam, spatial relation, Quasi Co-Location (QCL) type-D assumption, or spatial filter than the second PDCCH candidate. There could be 2 or 3 blind decode attempts for the first PDCCH candidate and the second PDCCH candidate.

In one embodiment, the network may not be allowed to configure the UE such that only one search space ID of one of the first two search spaces of the second cell is the same as one search space ID of one of the second two search spaces of the first cell. Furthermore, the network may not be allowed to configure the UE such that there is no PDCCH repetition of the two second search spaces of the first cell.

Referring back to FIGS. 3 and 4, in one exemplary embodiment of a network. The network 300 includes a program code 312 stored in the memory 310. The CPU 308 could execute program code 312 to enable the network (i) to configure a UE with cross-carrier scheduling, wherein the network transmits PDCCH on a first cell scheduling a second cell, and (ii) to configure the UE with PDCCH repetition on first two search spaces of the second cell, wherein the network shall configure the UE with PDCCH repetition on second two search spaces of the first cell, and search space IDs of the first two search spaces of the second cell are the same as search space IDs of the second two search spaces of the first cell. Furthermore, the CPU 308 can execute the program code 312 to perform all of the above-described actions and steps or others described herein.

Figure 15:
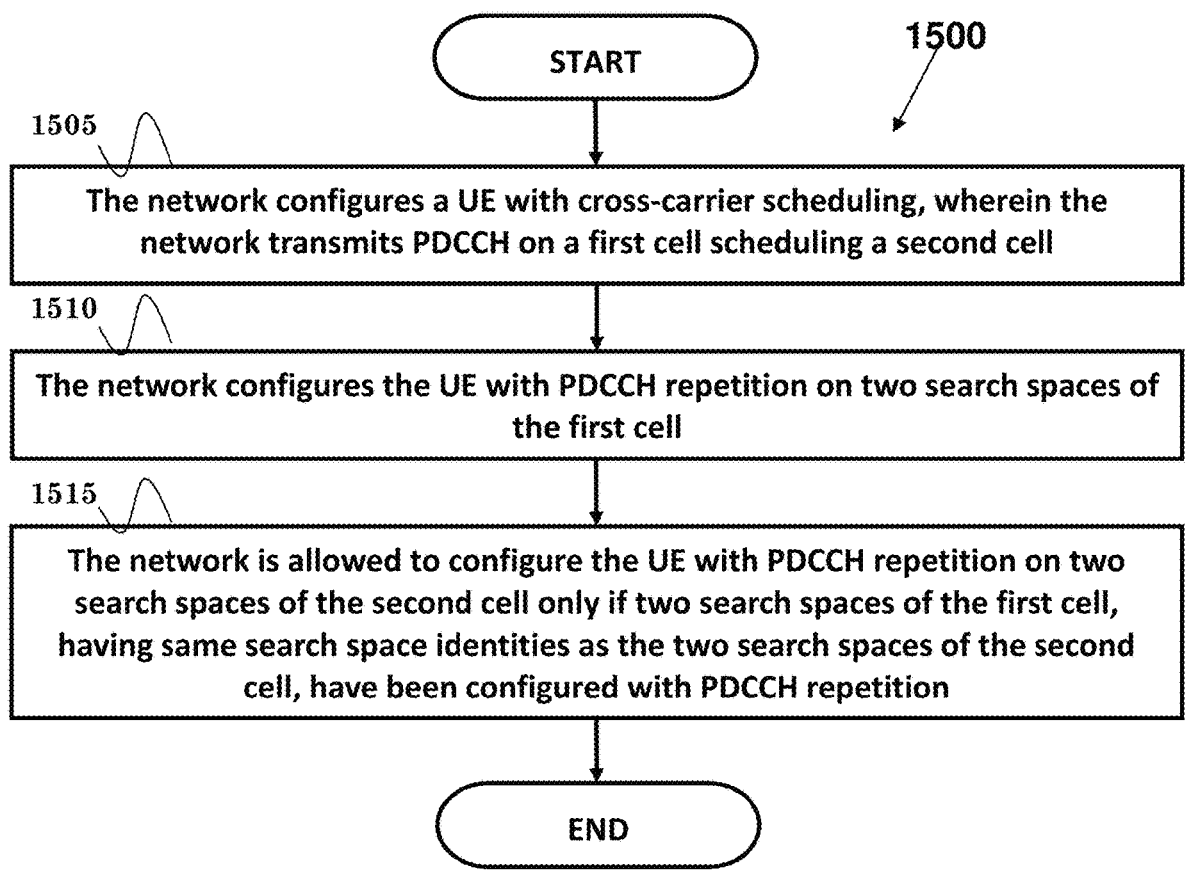
FIG. 15 is a flow chart according to one exemplary embodiment.

FIG. 15 is a flow chart 1500 according to one exemplary embodiment from the perspective of a network. In step 1505, the network configures a User Equipment (UE) with cross-carrier scheduling, wherein the network transmits Physical Downlink Control Channel (PDCCH) on a first cell scheduling a second cell. In step 1510, the network configures the UE with PDCCH repetition on two search spaces of the first cell. In step 1515, the network is allowed to configure the UE with PDCCH repetition on two search spaces of the second cell only if two search spaces of the first cell, having same search space identities as the two search spaces of the second cell, have been configured with PDCCH repetition.

In one embodiment, a first Physical Downlink Control Channel (PDCCH) candidate from one search space of the two search spaces of the second cell could have a same PDCCH candidate identity (ID) as a second PDCCH candidate from the other search space of the two search spaces of the second cell. The first PDCCH candidate could be associated with a different Transmission Configuration Indication (TCI) state, beam, spatial relation, Quasi Co-Location (QCL) type-D assumption, or spatial filter than the second PDCCH candidate. There could be 2 or 3 blind decode attempts for the first PDCCH candidate and the second PDCCH candidate.

In one embodiment, the network may not be allowed to configure the UE such that only one search space identity (ID) of one of the two search spaces of the second cell is the same as one search space ID of one of the two search spaces of the first cell. Furthermore, the the network may not be allowed to configure the UE such that there is no PDCCH repetition of the two search spaces of the first cell. In one embodiment, the two search spaces of the second cell are linked for PDCCH repetition only if the two search spaces of the first cell, having same search space identities as the two search spaces of the second cell, are linked for PDCCH repetition.

In one embodiment, the network could provide a same first set of parameters for configuring any two search spaces (SS) of one cell when the two SS of the one cell are linked for PDCCH repetition. The network may not be allowed to provide a different first set of parameters for configuring any two SS of one cell when the two SS of the one cell are linked for PDCCH repetition. The first set of parameters may comprise a number of PDCCH candidates for one or more aggregation levels (e.g., nrofCandidates), monitoringSlot-PeriodicityAndOffset, duration, monitoringSymbolsWithin-Slot, and searchSpaceType.

In one embodiment, in response to configuring the UE with linkage between a third search space (SS) and a fourth SS of the second cell for PDCCH repetition, the network could provide a same first set of parameters for configuring a first SS and the second SS of the first cell, wherein the first SS and the third SS could have same SS ID and the second SS and the fourth SS could have same SS ID. Furthermore, in response to configuring the UE with linkage between a third SS and a fourth SS of the second cell for PDCCH repetition, the network may not be allowed to provide a different first set of parameters for configuring the first SS and the second SS of the first cell, wherein the first SS and the third SS could have same SS ID and the second SS and the fourth SS could have same SS ID.

In one embodiment, for a first SS and a second SS of the first cell being linked for PDCCH repetition, a first PDCCH candidate from the first SS could have a same PDCCH candidate ID as a second PDCCH candidate from the second SS, and both the first PDCCH candidate and the second PDCCH candidate could schedule one same Physical Downlink Shared Channel (PDSCH) or Physical Uplink Shared Channel (PUSCH). For a third SS and a fourth SS of the second cell being linked for PDCCH repetition, a third PDCCH candidate from the third SS could have a same PDCCH candidate ID as a fourth PDCCH candidate from the fourth SS, and both the third PDCCH candidate and the fourth PDCCH candidate could schedule one same PDSCH or PUSCH. The first PDCCH candidate could be associated with a different TCI state, beam, spatial relation, QCL type-D assumption, or spatial filter than the second PDCCH candidate. The third PDCCH candidate could be associated with a different TCI state, beam, spatial relation, QCL type-D assumption, or spatial filter than the fourth PDCCH candidate. Alternatively, the third PDCCH candidate could be associated with a same TCI state, beam, spatial relation, QCL type-D assumption, or spatial filter as the first PDCCH candidate. The fourth PDCCH candidate could be associated with a same TCI state, beam, spatial relation, QCL type-D assumption, or spatial filter as the second PDCCH candidate. There could be 2 or 3 blind decode attempts for the first PDCCH candidate and the second PDCCH candidate, and/or there could be 2 or 3 blind decode attempts for the third PDCCH candidate and the fourth PDCCH candidate.

Referring back to FIGS. 3 and 4, in one exemplary embodiment of a network. The network 300 includes a program code 312 stored in the memory 310. The CPU 308 could execute program code 312 to enable the network (i) to configure a UE with cross-carrier scheduling, wherein the network transmits PDCCH on a first cell scheduling a second cell, (ii) to configure the UE with PDCCH repetition on two search spaces of the first cell, and (iii) to be allowed to configure the UE with PDCCH repetition on two search spaces of the second cell only if two search spaces with a same search space ID in the first cell have been configured with PDCCH repetition. Furthermore, the CPU 308 can execute the program code 312 to perform all of the above-described actions and steps or others described herein.

In an alternative method for a network in a wireless communication system, the network configures a UE with cross-carrier scheduling, wherein the network transmits PDCCH on a first cell scheduling a second cell. Furthermore, the network configures the UE with a first search space (SS) and a second SS of the first cell. In addition, the network configures the UE with a third SS and a fourth SS of the second cell, wherein the third SS has the same SS ID as the first SS and the fourth SS has the same SS ID as the second SS, and wherein if the network configures the UE with linkage between the first SS and the second SS of the first cell, the third SS is linked to the fourth SS.

In one embodiment, the network could provide a same first set of parameters for configuring any two SS of one cell when the two SS of the one cell are linked. The network may not be allowed to provide a different first set of parameters for configuring any two SS of one cell when the two SS of the one cell are linked.

In one embodiment, in response to configuring the UE with linkage between the first SS and the second SS of the first cell, the network could provide a same first set of parameters for configuring the third SS and the fourth SS of the second cell. Furthermore, in response to configuring the UE with linkage between the first SS and the second SS of the first cell, the network may not be allowed to provide a different first set of parameters for configuring the third SS and the fourth SS of the second cell. The first set of parameters may comprise a number of PDCCH candidates for one or more aggregation level (e.g., nrofCandidates), monitoringSlotPeriodicityAndOffset, duration, monitoringSymbolsWithinSlot, and searchSpaceType.

In one embodiment, a first PDCCH candidate from the first SS could have the same PDCCH candidate ID as a second PDCCH candidate from the second SS. A third PDCCH candidate from the third SS could have the same PDCCH candidate ID as a fourth PDCCH candidate from the fourth SS. The first PDCCH candidate could be associated with a different TCI state, beam, spatial relation, QCL type-D assumption, or spatial filter than the second PDCCH candidate. The third PDCCH candidate could be associated with a different TCI state, beam, spatial relation, QCL type-D assumption, or spatial filter than the fourth PDCCH candidate. There could be 2 or 3 blind decode attempts for the first PDCCH candidate and the second PDCCH candidate; and/or there could be 2 or 3 blind decode attempts for the third PDCCH candidate and the fourth PDCCH candidate.

In one embodiment, if the network does not configure the UE with linkage between the first SS and the second SS of the first cell, the third SS may not be linked to the fourth SS. The network may not be allowed to configure different first set of parameters for the third SS and for the fourth SS. When the first SS is link with the second SS, both the first PDCCH candidate and the second PDCCH candidate could schedule one same PDSCH or PUSCH, and/or the first PDCCH candidate could provide a same uplink scheduling or downlink assignment as the second PDCCH candidate. When the third SS is link with the second SS, both the third PDCCH candidate and the fourth PDCCH candidate could schedule one same PDSCH or PUSCH, and/or the third PDCCH candidate could provide a same uplink scheduling or downlink assignment as the fourth PDCCH candidate.

In an alternative method for a UE in a wireless communication system, te UE is configured with cross-carrier scheduling (CrossCarrierSchedulingConfig), wherein the UE receives PDCCH on a first cell scheduling a second cell. Furthermore, the UE is configured with a first SS with a first SS ID, and a second SS with a second SS ID of the second cell. In addition, te UE is configured with PDCCH repetition on the first SS and the second SS or link of the first SS and the second SS, wherein number of PDCCH candidates for each aggregation level for the first SS and the second SS is the same. Also, the UE is configured with a third SS with the first SS ID, and a fourth SS with the second SS ID of the first cell, wherein the configuration of the third SS and the fourth SS at least comprises a first set of parameters, a second set of parameters, and a third set of parameters. The UE does not expect that configuration for the third SS and the fourth SS without limited configuration.

In an alternative method for a network in a wireless communication system, the network configures a UE with cross-carrier scheduling (CrossCarrierSchedulingConfig), wherein the network transmits PDCCH on a first cell scheduling a second cell. Furthermore, the network configures the UE with a first SS with a first SS ID, and a second SS with a second SS ID of the second cell. In addition, the network configures the UE with PDCCH repetition on the first SS and the second SS or link of the first SS and the second SS, wherein number of PDCCH candidates for each aggregation level for the first SS and the second SS is the same. Also, the network configures the UE with a third SS with the first SS ID, and a fourth SS with the second SS ID of the first cell, wherein the configuration of the third SS and the fourth SS at least comprises a first set of parameters, a second set of parameters, and a third set of parameters. The network provides or configures the UE for the third SS and the fourth SS with limited configuration.

In one embodiment, the limited configuration may at least comprise the same value of the second set of parameters, and/or same number of bit positions with value 1 from the third set of parameters. The limited configuration may not comprise that the same value of the first set of parameters. The first set of parameters may comprise a number of PDCCH candidates for one or more aggregation level (e.g., nrofCandidates). The second set of parameters may comprise at least monitoringSlotPeriodicityAndOffset, duration, monitoringSymbolsWithinSlot, and searchSpaceType. The second set of parameters may (further) comprise CORESET related parameters. The third set of parameters may comprise a bit-map with one or more bit positions with value 1 for indicating starting OFDM symbol of the one or more PDCCH monitoring occasion (e.g., monitoringSymbolsWithinSlot). CORESET related parameters could be associated with one or two search spaces of scheduling cell. CORESET related parameters may comprise CORESET ID and/or number of TCI bits in DCI on the CORESET (e.g., tci-PresentInDCI and/or tci-PresentDCI-1-2-r16).

In alternative method for a UE in a wireless communication system, the UE is configured with cross-carrier scheduling (CrossCarrierSchedulingConfig), wherein the UE receives PDCCH on a first cell scheduling a second cell. Furthermore, the UE is configured with PDCCH repetition on the second cell. In response to being configured with PDCCH repetition on the second cell, the UE is configured with or expects to be configured with PDCCH repetition on the first cell.

In one embodiment, the UE could be configured with a first SS with a first SS ID and a second SS with a second SS ID of the second cell. The UE could be configured with linkage or PDCCH repetition of the first SS and the second SS of the second cell. PDCCH repetition on the first cell could mean that a third SS with the first SS ID and a fourth SS with the second SS ID of the first cell are linked or being configured with PDCCH repetition. PDCCH repetition on the first cell may not comprise SS of the first cell which SS ID being associated to a SS of the second cell which does not have linked SS of the second cell. Configuration of a SS (e.g., SS of the second cell) may at least comprise a first set of parameters. Configuration of a SS (e.g., SS of the first cell) may at least comprise a first set of parameters, a second set of parameters, and a third set of parameters. For PDCCH repetition for the third SS and the fourth SS, UE could receive or expect to be configured with configuration of the same first set of parameters, the same second set of parameters, and limited/restricted the third set of parameters for the third SS and the fourth SS.

In an alternative method for a UE in a wireless communication system, the UE is configured with cross-carrier scheduling (CrossCarrierSchedulingConfig), wherein the UE receives PDCCH on a first cell scheduling a second cell. The UE is configured with PDCCH repetition on the first cell. In response to being configured with PDCCH repetition on the first cell, the UE is configured with or expects to be configured with PDCCH repetition on the second cell.

In one embodiment, the UE could be configured with a third SS with a first SS ID and a fourth SS with a second SS ID of the first cell. The UE could be configured with linkage or PDCCH repetition of the third SS and the fourth SS of the first cell. PDCCH repetition on the second cell could mean that a first SS with the first SS ID and a second SS with the second SS ID of the second cell are linked or being configured with PDCCH repetition. PDCCH repetition on the second cell may not comprise SS of the second cell which SS ID being associated to a SS of the first cell which does not have linked SS of the first cell. Configuration of a SS (e.g., SS of the second cell1 may at least comprise a first set of parameters. Configuration of a SS (e.g., SS of the first cell1 may at least comprise a first set of parameters, a second set of parameters, and a third set of parameters. For PDCCH repetition for the first SS and the second SS, UE could receive or expect to be configured with configuration of the same first set of parameters.

In an alternative method for a network in a wireless communication system, the network configures a UE with cross-carrier scheduling (CrossCarrierSchedulingConfig), wherein the network transmits PDCCH on a first cell scheduling a second cell. Furthermore, the network configures the UE with a first SS with a first SS ID, and a second SS with a second SS ID of the second cell. The network is not allowed to configure the UE with PDCCH repetition on the first cell or the second cell.

In an alternative method for a network in a wireless communication system, the network configures a UE with a plurality of cells. The network is not allowed to configure the UE with PDCCH repetition on a cell if the cell is a SCell or is cross-carrier/cell scheduled by another cell or the the cell is a sPCell being cross-carrier/cell scheduled by an SCell.

In an alternative method for a UE in a wireless communication system, the UE is configured with cross-carrier scheduling (CrossCarrierSchedulingConfig), wherein the UE receives PDCCH on a first cell scheduling a second cell. Furthermore, the UE is configured with PDCCH repetition on a first SS and a second SS of the second cell or link of the first SS and the second SS of the second cell. In addition, the UE is configured with PDCCH repetition on a third SS and a fourth SS of the first cell, wherein SS ID(s) of the third SS and the fourth SS are non-overlapped with (any) SS ID(s) of the first SS and the second SS of the second cell (e.g., two SS ID(s) are different), and/or SS ID(s) of the third SS and the fourth SS are (fully) overlapped with SS ID(s) of the first SS and the second SS of the second cell (e.g., same SS ID(s)).

In an alternative method for a UE in a wireless communication system, the UE is configured with cross-carrier scheduling (CrossCarrierSchedulingConfig), wherein the UE receives PDCCH on a first cell scheduling a second cell. Furthermore, the UE is configured with PDCCH repetition on a third SS and a fourth SS of the first cell or link of the third SS and the fourth SS of the first cell. In addition, the UE is configured with PDCCH repetition on a first SS and a second SS of the second cell, wherein SS ID(s) of the first SS and the second SS are non-overlapped with (any) SS ID(s) of the third SS and the fourth SS of the first cell (e.g., two SS ID(s) are different), and/or SS ID(s) of the first SS and the second SS are (fully) overlapped with SS ID(s) of the third SS and the fourth SS of the first cell (e.g., same SS ID(s)).

In an alternative method for a UE in a wireless communication system, the UE is configured with cross-carrier scheduling (CrossCarrierSchedulingConfig), wherein the UE receives PDCCH on a first cell scheduling a plurality of cells. Furthermore, the UE is configured with PDCCH repetition on a first SS and a second SS of one cell among the first cell or the plurality of cells. In addition, the UE is configured with PDCCH repetition on a third SS and a fourth SS of another cell among the first cell or the plurality of cells, wherein SS ID(s) of the third SS and the fourth SS are non-overlapped with (any) SS ID(s) of the first SS and the second SS (e.g., two SS ID(s) are different), and/or SS ID(s) of the third SS and the fourth SS are fully overlapped with SS ID(s) of the first SS and the second SS (e.g., same SS ID(s)).

In an alternative method for a UE, in a wireless communication system, the UE is configured with cross-carrier scheduling (CrossCarrierSchedulingConfig), wherein the UE receives PDCCH on a first cell scheduling a plurality of cells. Furthermore, the UE is configured with PDCCH repetition on a first SS and a second SS of one cell among the first cell or the plurality of cells. In addition, the UE is configured with PDCCH repetition on a third SS and a fourth SS of another cell among the first cell or the plurality of cells, wherein the UE does not expect that SS ID(s) of the third SS and the fourth SS are (partially) overlapped with SS ID(s) of the first SS and the second SS (e.g., only one SS ID is the same).

In an alternative method for a network in a wireless communication system, the network configures UE with cross-carrier scheduling (CrossCarrierSchedulingConfig), wherein the network transmits PDCCH on a first cell scheduling a plurality of cells. Furthermore, the network configures the UE with PDCCH repetition on a first SS and a second SS of one cell among the first cell or the plurality of cells. In addition, the network configures the UE with PDCCH repetition on a third SS and a fourth SS of another cell among the first cell or the plurality of cells, wherein SS ID(s) of the third SS and the fourth SS are non-overlapped with (any) SS ID(s) of the first SS and the second SS (e.g., two SS ID(s) are different), and/or SS ID(s) of the third SS and the fourth SS are fully overlapped with SS ID(s) of the first SS and the second SS (e.g., same SS ID(s)).

In an alternative method for a network, in a wireless communication system, the network configures UE with cross-carrier scheduling (CrossCarrierSchedulingConfig), wherein the network transmits PDCCH on a first cell scheduling a plurality of cells. Furthermore, the network configures the UE with PDCCH repetition on a first SS and a second SS of one cell among the first cell or the plurality of cells. In addition, the network configures the UE with PDCCH repetition on a third SS and a fourth SS of another cell among the first cell or the plurality of cells, wherein the network is not allowed to configure such that SS ID(s) of the third SS and the fourth SS are (partially) overlapped with SS ID(s) of the first SS and the second SS (e.g., only one SS ID is the same).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network, in a wireless communication system, comprising:

the network configures a User Equipment (UE) with cross-carrier scheduling, wherein the network transmits Physical Downlink Control Channel (PDCCH) on a first cell scheduling a downlink allocation or an uplink grant for a second cell; and the network configures the UE with a first PDCCH repetition on first two search spaces of the second cell, wherein the network shall configure the UE with a second PDCCH repetition on second two search spaces of the first cell, and search space Identities (IDs) of the first two search spaces of the second cell are the same as search space IDs of the second two search spaces of the first cell.

2. The method of claim 1, wherein a first Physical Downlink Control Channel (PDCCH) candidate from one search space of the first two search spaces of the second cell has a same PDCCH candidate identity (ID) as a second PDCCH candidate from the other search space of the first two search spaces of the second cell.

3. The method of claim 2, wherein a first PDCCH candidate is associated with a different Transmission Configuration Indication (TCI) state, beam, spatial relation, Quasi Co-Location (QCL) type-D assumption, or spatial filter than a second PDCCH candidate.

4. The method of claim 2, wherein there are 2 or 3 blind decode attempts for the first PDCCH candidate and the second PDCCH candidate.

5. The method of claim 1, wherein the network is not allowed to configure the UE such that only one search space ID of one of the first two search spaces of the second cell is the same as one search space ID of one of the second two search spaces of the first cell.

6. The method of claim 1, wherein the network is not allowed to configure the UE such that there is no second PDCCH repetition of the two second search spaces of the first cell.

7. A method for a network, in a wireless communication system, comprising:
the network configures a User Equipment (UE) with cross-carrier scheduling, wherein the network transmits Physical Downlink Control Channel (PDCCH) on a first cell scheduling a downlink allocation or an uplink grant for a second cell;
the network configures the UE with a first PDCCH repetition on two search spaces of the first cell; and
the network is allowed to configure the UE with a second PDCCH repetition on two search spaces of the second cell only if the two search spaces of the first cell, having same search space identities as the two search spaces of the second cell, have been configured with the first PDCCH repetition.

8. The method of claim 7, wherein a first Physical Downlink Control Channel (PDCCH) candidate from one search space of the two search spaces of the second cell has a same PDCCH candidate identity (ID) as a second PDCCH candidate from the other search space of the two search spaces of the second cell.

9. The method of claim 8, wherein the first PDCCH candidate is associated with a different Transmission Configuration Indication (TCI) state, beam, spatial relation, Quasi Co-Location (QCL) type-D assumption, or spatial filter than the second PDCCH candidate.

10. The method of claim 8, wherein there are 2 or 3 blind decode attempts for the first PDCCH candidate and the second PDCCH candidate.

11. The method of claim 7, wherein the network is not allowed to configure the UE such that only one search space identity (ID) of one of the two search spaces of the second cell is the same as one search space ID of one of the two search spaces of the first cell, and/or
wherein the network is not allowed to configure the UE such that there is no first PDCCH repetition of the two search spaces of the first cell.

12. The method of claim 7, the two search spaces of the second cell are linked for the second PDCCH repetition only if the two search spaces of the first cell, having same search space identities as the two search spaces of the second cell, are linked for the first PDCCH repetition.

13. The method of claim 7, wherein the network shall provide a same first set of parameters for configuring any two search spaces (SS) of one cell when the two SS of the one cell are linked for one PDCCH repetition, and/or
wherein the network is not allowed to provide a different first set of parameters for configuring any two SS of one cell when the two SS of the one cell are linked for one PDCCH repetition.

14. The method of claim 13, wherein the first set of parameters comprises a number of PDCCH candidates for one or more aggregation levels, monitoringSlotPeriodicityAndOffset, duration, monitoringSymbolsWithinSlot, and searchSpaceType.

15. The method of claim 7, wherein in response to configuring the UE with linkage between a third search space (SS) and a fourth SS of the second cell for the second PDCCH repetition, the network shall provide a same first set of parameters for configuring a first SS and the second SS of the first cell, wherein the first SS and the third SS have same SS ID and the second SS and the fourth SS have same SS ID, and/or
in response to configuring the UE with linkage between a third SS and a fourth SS of the second cell for the second PDCCH repetition, the network is not allowed to provide a different first set of parameters for configuring the first SS and the second SS of the first cell, wherein the first SS and the third SS have same SS ID and the second SS and the fourth SS have same SS ID.

16. The method of claim 7, wherein for a first SS and a second SS of the first cell being linked for the first PDCCH repetition, a first PDCCH candidate from the first SS has a same PDCCH candidate ID as a second PDCCH candidate from the second SS, and both the first PDCCH candidate and the second PDCCH candidate schedule same Physical Downlink Shared Channel (PDSCH) or Physical Uplink Shared Channel (PUSCH), and/or
wherein for a third SS and a fourth SS of the second cell being linked for the second PDCCH repetition, a third PDCCH candidate from the third SS has a same PDCCH candidate ID as a fourth PDCCH candidate from the fourth SS, and both the third PDCCH candidate and the fourth PDCCH candidate schedule same PDSCH or PUSCH.

17. The method of claim 16, wherein the first PDCCH candidate is associated with a different Transmission Configuration Indication (TCI) state, beam, spatial relation, Quasi Co-Location (QCL) type-D assumption, or spatial filter than the second PDCCH candidate, and/or
wherein the third PDCCH candidate is associated with a different TCI state, beam, spatial relation, QCL type-D assumption, or spatial filter than the fourth PDCCH candidate, and/or
wherein the third PDCCH candidate is associated with a same TCI state, beam, spatial relation, QCL type-D assumption, or spatial filter as the first PDCCH candidate, and/or wherein the fourth PDCCH candidate is associated with a same TCI state, beam, spatial relation, QCL type-D assumption, or spatial filter as the second PDCCH candidate.

18. The method of claim 16, wherein there are 2 or 3 blind decode attempts for the first PDCCH candidate and the second PDCCH candidate, and/or there are 2 or 3 blind decode attempts for the third PDCCH candidate and the fourth PDCCH candidate.

19. A network, comprising:
a control circuit;
a processor installed in the control circuit; and
a memory installed in the control circuit and operatively coupled to the processor;
wherein the processor is configured to execute a program code stored in the memory to:
configure a User Equipment (UE) with cross-carrier scheduling, wherein the network transmits Physical Downlink Control Channel (PDCCH) on a first cell scheduling a downlink allocation or an uplink grant for a second cell; and
configure the UE with a second PDCCH repetition on first two search spaces of the second cell, wherein the network shall configure the UE with a first PDCCH repetition on second two search spaces of the first cell, and search space Identities (IDs) of the first two search spaces of the second cell are the same as search space IDs of the second two search spaces of the first cell.

20. A network, comprising:
a control circuit;
a processor installed in the control circuit; and
a memory installed in the control circuit and operatively coupled to the processor;
wherein the processor is configured to execute a program code stored in the memory to:
configure a User Equipment (UE) with cross-carrier scheduling, wherein the network transmits Physical Downlink Control Channel (PDCCH) on a first cell scheduling a downlink allocation or an uplink a second cell;
configure the UE with a first PDCCH repetition on two search spaces of the first cell; and
be allowed to configure the UE with a second PDCCH repetition on two search spaces of the second cell only if the two search spaces of the first cell, having same search space identities as the two search spaces of the second cell, have been configured with the first PDCCH repetition.

* * * * *